Figure 6:
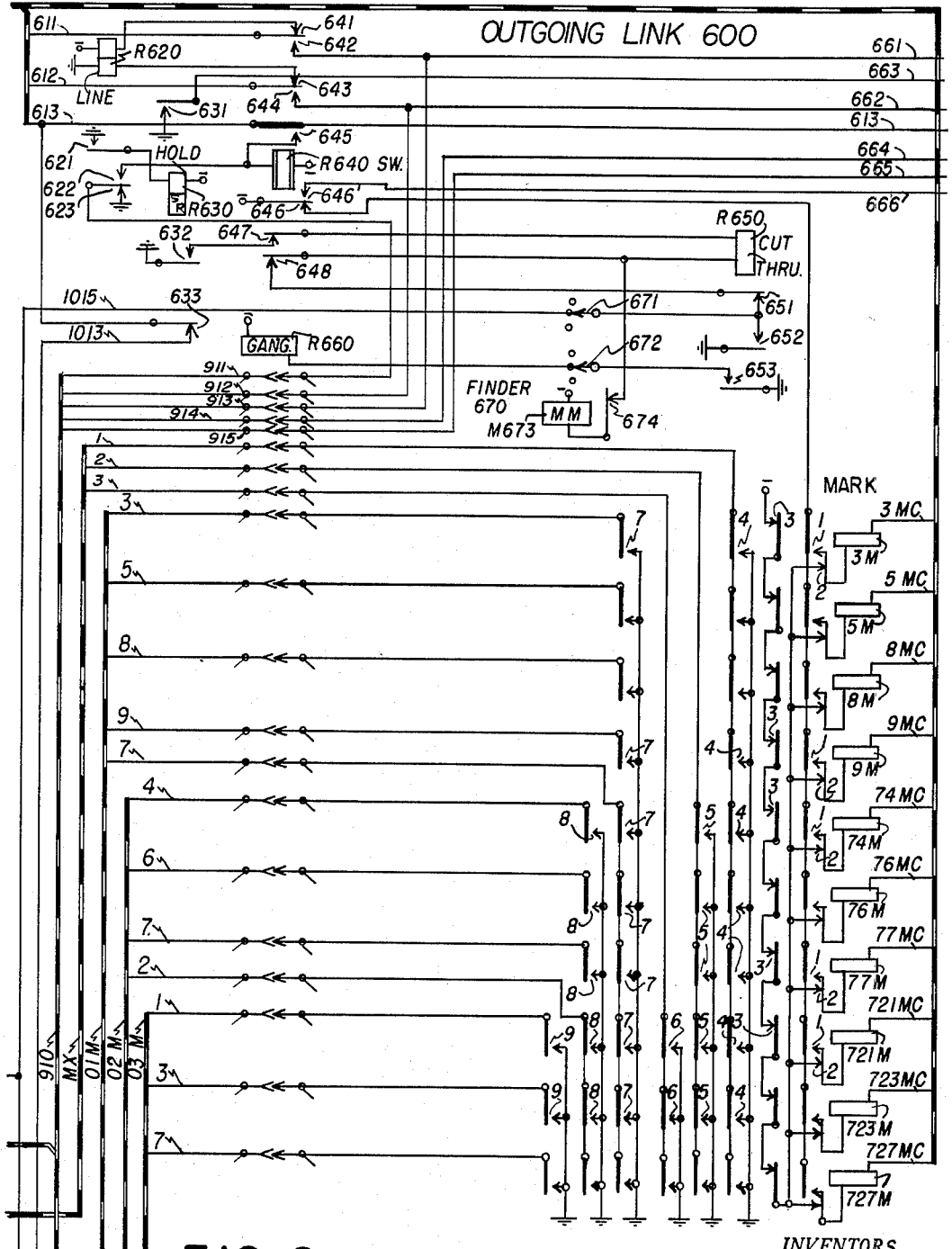

March 20, 1956
D. O. BAIRD ET AL
2,739,184
AUTOMATIC TELEPHONE SYSTEMS PROVIDED
WITH TOLL RECORDING FACILITIES
Filed June 15, 1951
10 Sheets-Sheet 1
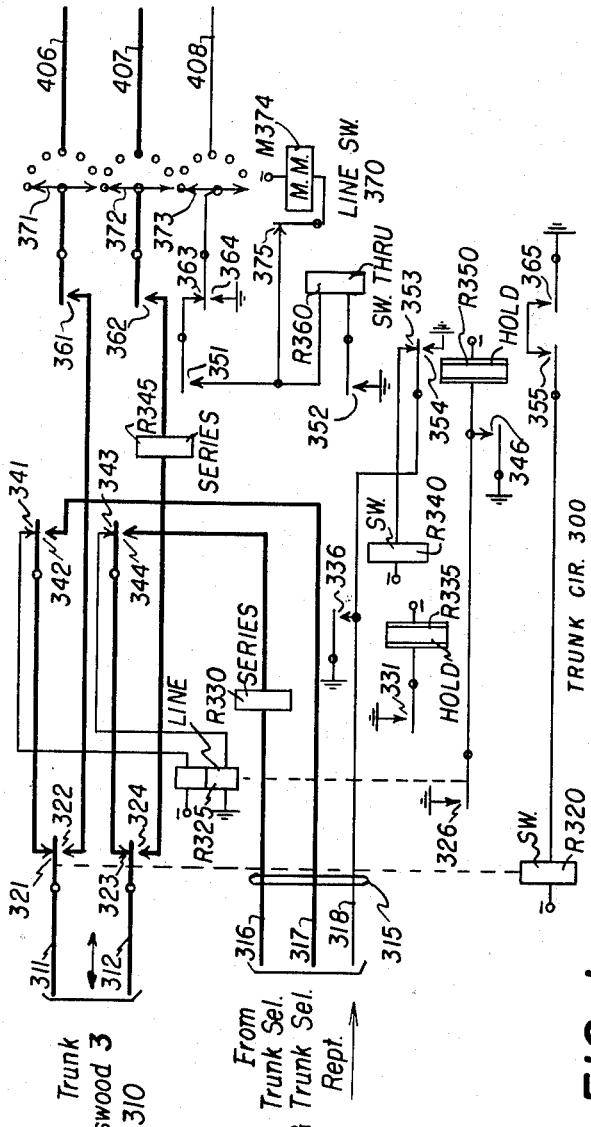
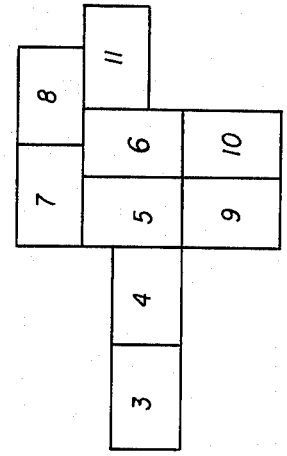
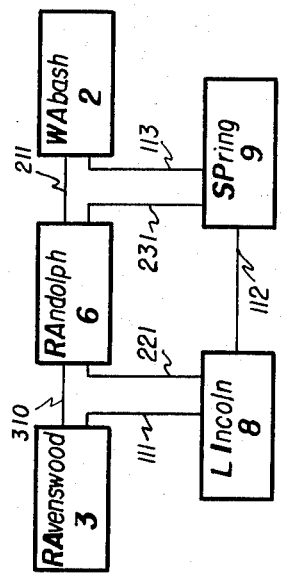
*INVENTORS*
Douglas O. Baird
BY  Raymond G. Bielenberg
*Smith, Olsen & Baird*
Attys.

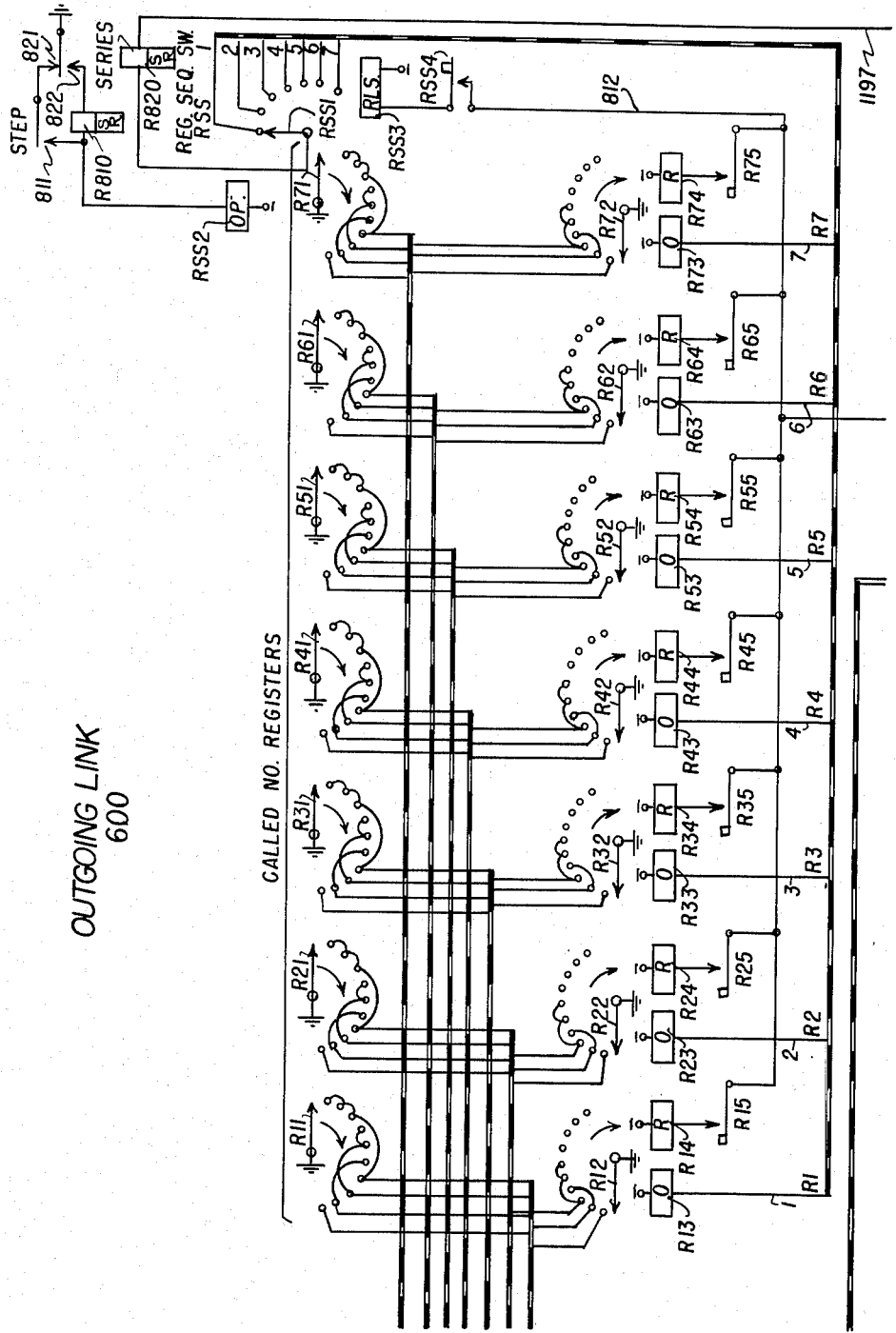

INVENTORS
Douglas O. Baird
Raymond G. Bielenberg
BY
Smith, Olsen + Baird
Attys.

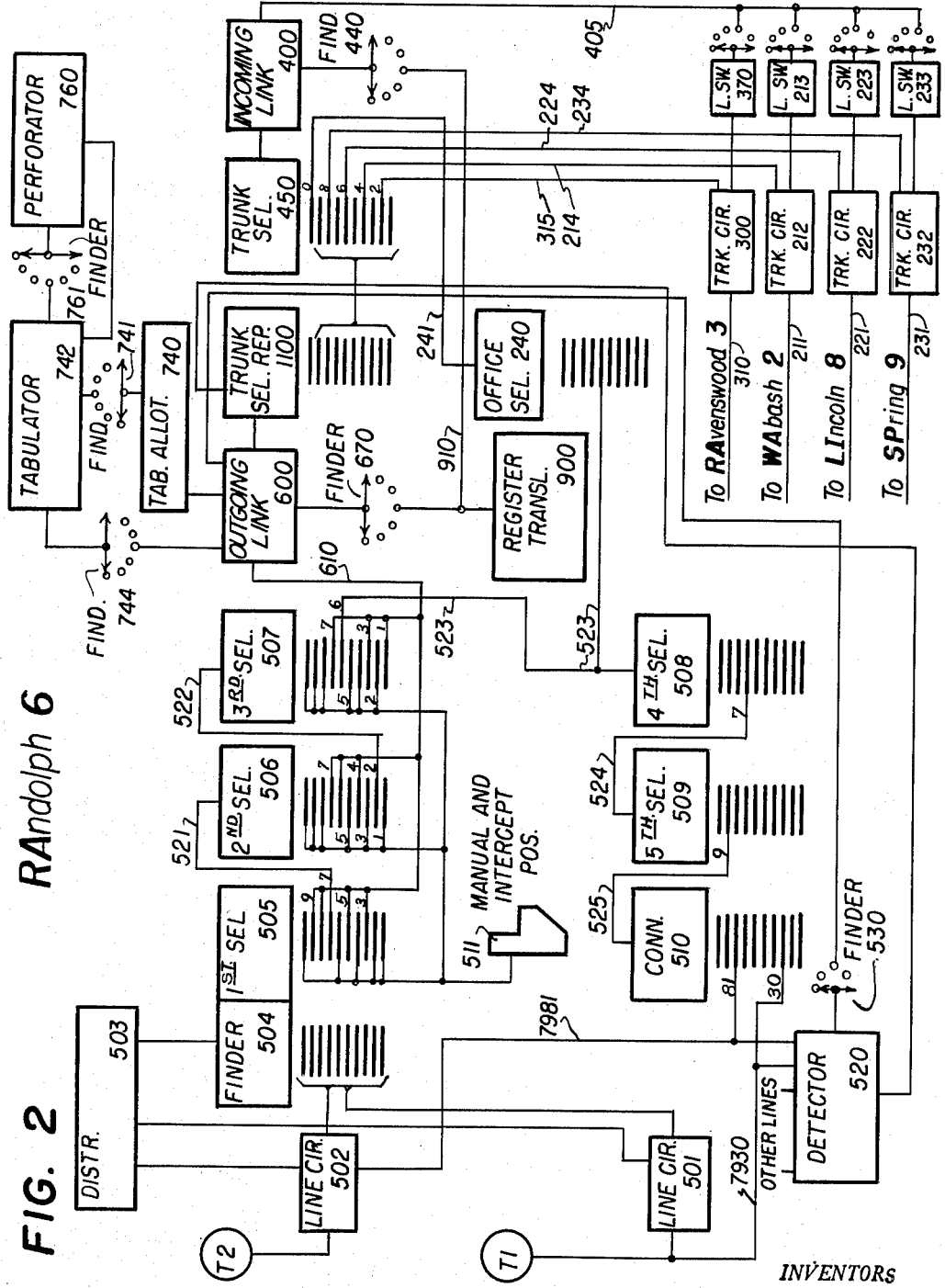

INVENTORS
Douglas O. Baird
BY  Raymond G. Bielenberg

Smith, Olsen + Baird
Attys.

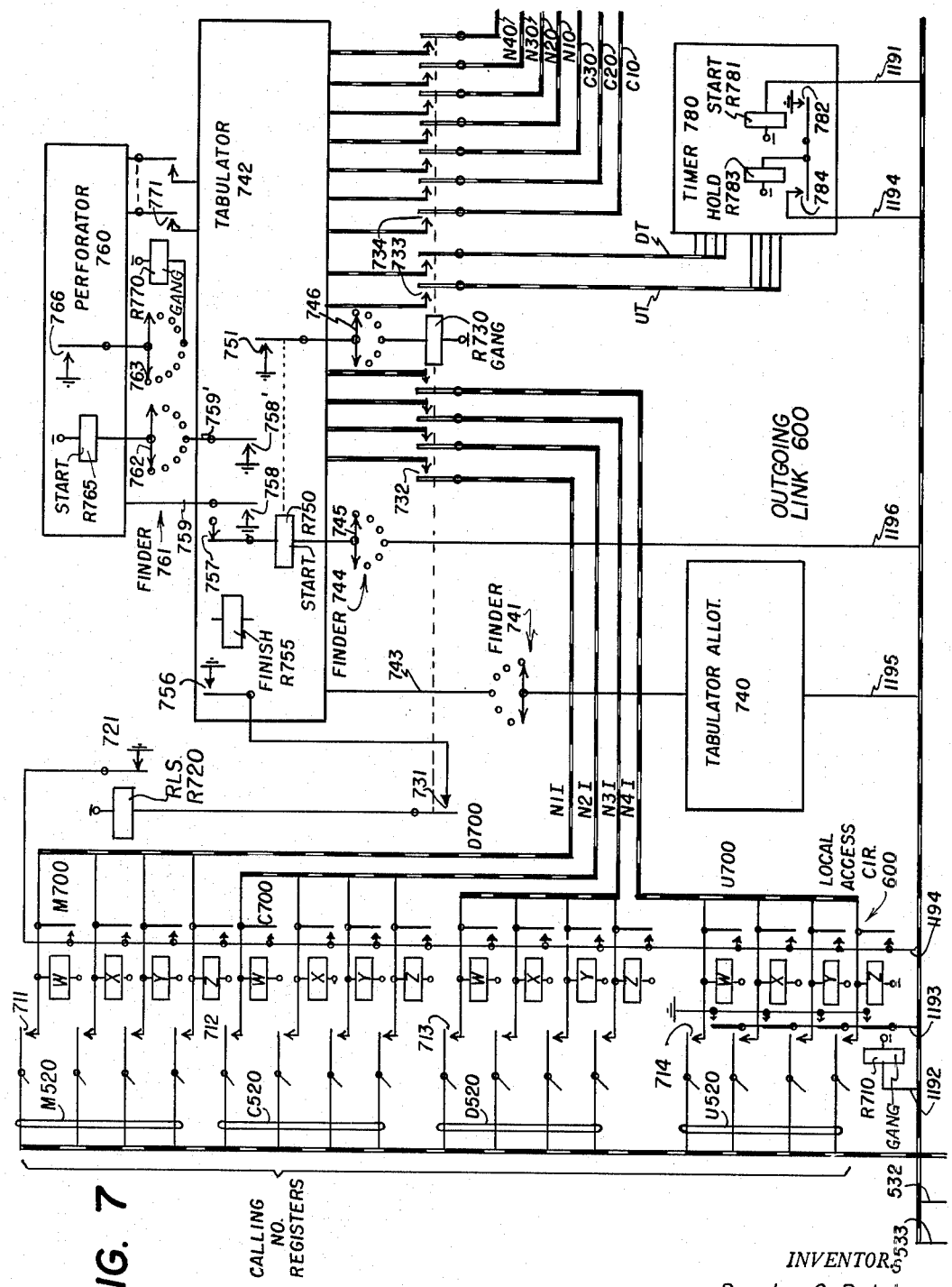

March 20, 1956
D. O. BAIRD ET AL
2,739,184
AUTOMATIC TELEPHONE SYSTEMS PROVIDED
WITH TOLL RECORDING FACILITIES
Filed June 15, 1951
10 Sheets-Sheet 9
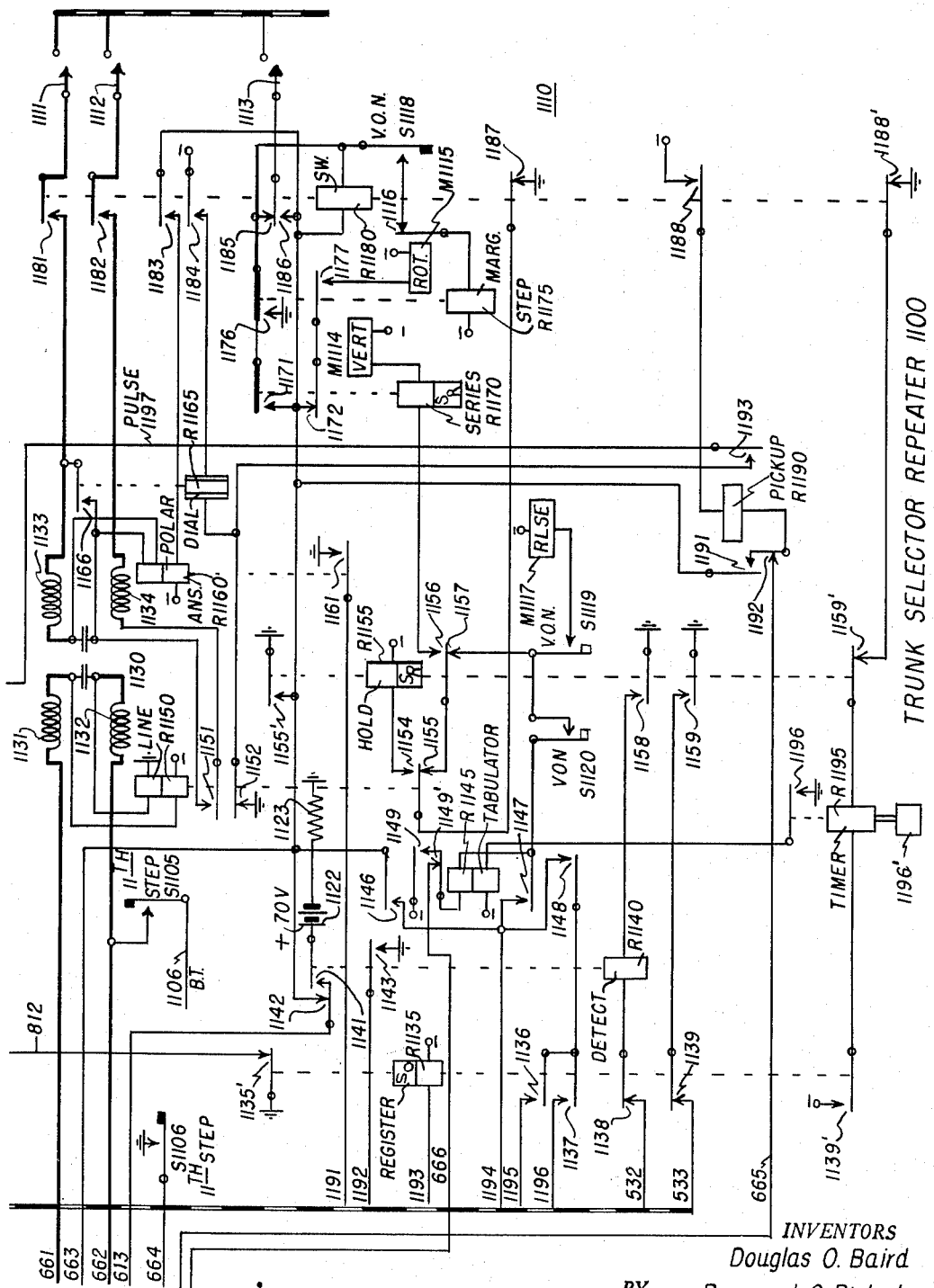
INVENTORS
Douglas O. Baird
Raymond G. Bielenberg
BY
Smith, Olsen & Baird
Attys.

REGISTER TRANSLATOR 900

INVENTORS
Douglas O. Baird
Raymond G. Bielenberg
BY Smith, Olsen + Baird
Attys.

United States Patent Office 2,739,184
Patented Mar. 20, 1956

2,739,184

AUTOMATIC TELEPHONE SYSTEMS PROVIDED WITH TOLL RECORDING FACILITIES

Douglas O. Baird, Skokie, and Raymond G. Bielenberg, Berwyn, Ill., assignors to Automatic Electric Laboratories, Inc., Chicago, Ill., a corporation of Delaware Application June 15, 1951, Serial No. 231,728

20 Claims. (Cl. 179—18)

The present invention relates to automatic telephone systems provided with toll recording facilities and more particularly to such systems in which short or suburban toll calls are set up directly by calling subscribers, without the assistance of operators, and in which records are automatically produced in conjunction with such toll calls for subscriber billing purposes.

Each office of an automatic telephone system of the character noted usually comprises a plurality of trunks terminating in switching apparatus, a plurality of register-translators, and equipment responsive to the presence of a calling line for connecting the calling line to an idle one of the trunks and for connecting an idle one of the register-translators to the one trunk. The subscriber at the subscriber substation on the calling line then proceeds to dial the three code digits of the desired or called office and the four numerical digits of the desired or called subscriber line therein. The one register-translater registers the three office code digits and determines therefrom whether the call is to be completed in the local office of the calling subscriber line or in a remote office. In the event it is determined that the call is to be completed in the local office, the register-translator is dismissed after registering the third office code digit so that the four numerical digits dialed over the calling line are effective directly to operate the switching apparatus terminating the one trunk in order to extend the connection from the one trunk to the called line in the local office. On the other hand, in the event it is determined that the call is to be completed in a remote office, the register-translator is held and later effects operation of the switching apparatus terminating the one trunk to select a trunk line extending to the remote office, or at least to a tandem office in route to the remote office, and then transmits digits over the trunk line noted so that other equipment and switching apparatus may be controlled to complete the connection to the called line in the remote office. The connection between the one trunk and the trunk line over which the toll call is completed includes equipment for accumulating items of record information in conjunction with the toll call; and facility is provided for recording the items noted for billing purposes.

A telephone system of the character noted is quite satisfactory in operation; however the number of register-translators required in each office is rather large since a register-translator is employed in conjunction with the extension of each call regardless of whether the call ultimately proves to be a local call or a toll call.

While it has been proposed that the switching apparatus in each office be arranged so that the trunk to which the register-translator is connected is seized by the switching apparatus only in the event of the extension of a toll call from the calling line, no simple arrangement of equipment to achieve this result has been suggested due primarily to the difficulty that the trunk noted must be selected by the switching apparatus in response to certain first office code digits and in response to certain combinations of first and second office code digits and in response to certain combinations of first and second and third office code digits, and the value of each of the office code digits noted employed in the operation of the switching apparatus to seize the trunk must be recaptured and registered subsequent to operation of the switching apparatus to seize the trunk.

Accordingly, it is a general object of the present invention to provide in an automatic telephone system including a plurality of toll links and automatic switching apparatus that is selectively operated by the dialing over a connected calling line of certain first office code digits and of certain combinations of first and second office code digits and of certain combinations of first and second and third office code digits to seize an idle one of the toll links, an improved and simplified circuit arrangement incorporated in each of the toll links for recapturing and registering therein the value or values of the office code digit or digits noted employed in operating the switching apparatus to seize the toll link.

Another object of the invention is to provide in a telephone system of the character noted including a plurality of register-translators, an arrangement for pre-selecting idle ones of the register-translators and for connecting them to idle ones of the toll links, and an arrangement for transferring from a seized one of the toll links to the connected one of the register-translators the recaptured office code digit or digits registered in the one toll link.

Another object of the invention is to provide in a telephone system of the character noted, an improved arrangement of the switching apparatus so that the switching apparatus is operated directly by the dialing over a connected calling line of an appropriate digit or series of digits selectively to complete an operator call or a local call independently of the toll links and the register-translators mentioned.

A further object of the invention is to provide in a telephone system of the character noted, an improved arrangement in each toll link for transferring the recaptured office code digit or digits to the connected register-translator and for repeating to the connected register-translator each of the digits dialed over the calling line following the seizure of the toll link by the switching apparatus, wherein the office code digits and the numerical digits dialed over the calling line are registered in corresponding ones of office code digit registers and numerical digit registers provided in the connected register-translator, regardless of whether the switching apparatus was operated by one or two or three of the office code digits to seize the toll link.

A further object of the invention is to provide in a telephone system of the character noted, an arrangement for connecting calling incoming trunk lines to each office to an idle one of the register-translators in the office so that the register translator may be employed to control the switching apparatus in the office for the purposes of completing toll calls to called lines in the office and of extending toll calls to called outgoing trunk lines from the office.

A further object of the invention is to provide in a telephone system of the character noted, a plurality of trunk selector repeaters respectively terminating the toll links so that the link selector repeater terminating a toll trunk may be operated by a routing digit transmitted from the connected register-translator in order to select an idle outgoing trunk line and may then be operated to repeat over the selected trunk line the remainder of the digits transmitted from the connected register-translator.

A further object of the invention is to provide in a telephone system of the character noted, an improved arrangement in each trunk selector repeater for effecting the registration in the associated toll link of the office code digits and the numerical digits that it repeats over the selected outgoing trunk line.

A further object of the invention is to provide in a telephone system of the character noted, an improved arrangement that is responsive to seizure of a toll link for immediately identifying the numerical designation of the calling line connected to the switching apparatus that has seized the toll link and for registering the digits of the identified numerical designation directly in the toll link.

It is a still further object of the invention to provide in a telephone system of the character noted, an improved arrangement for accumulating all of the items of record information pertinent to a toll call extended via one of the toll links and for registering all of the accumulated items in the one toll link, and an improved arrangement for recording all of the registered items incident to the release of the one toll link, regardless of whether the toll call was or was not answered.

Further features of the invention pertain to the particular arrangement of the circuit elements of the system, whereby the above-outlined and additional operating features thereof are attained.

*Section 1.—The general arrangement of the telephone system*

The invention, both as to its organization and method of operation, together with further objects and advantages thereof, will best be understood by reference to the following specification taken in connection with the accompanying drawings, in which Figure 1 is a schematic diagram of the area served by the telephone system embodying the present invention; Fig. 2 is a schematic diagram of the general arrangement of the apparatus incorporated in one of the offices of the system shown in Fig. 1; Figs. 3 to 11, inclusive, taken together, illustrate the details of certain of the apparatus in the office shown in Fig. 2, which apparatus has embodied therein the features of the invention as briefly outlined above; and Fig. 12 illustrates the mode of combining Figs. 3 to 11, inclusive, to form a unified diagram.

Figure 4:
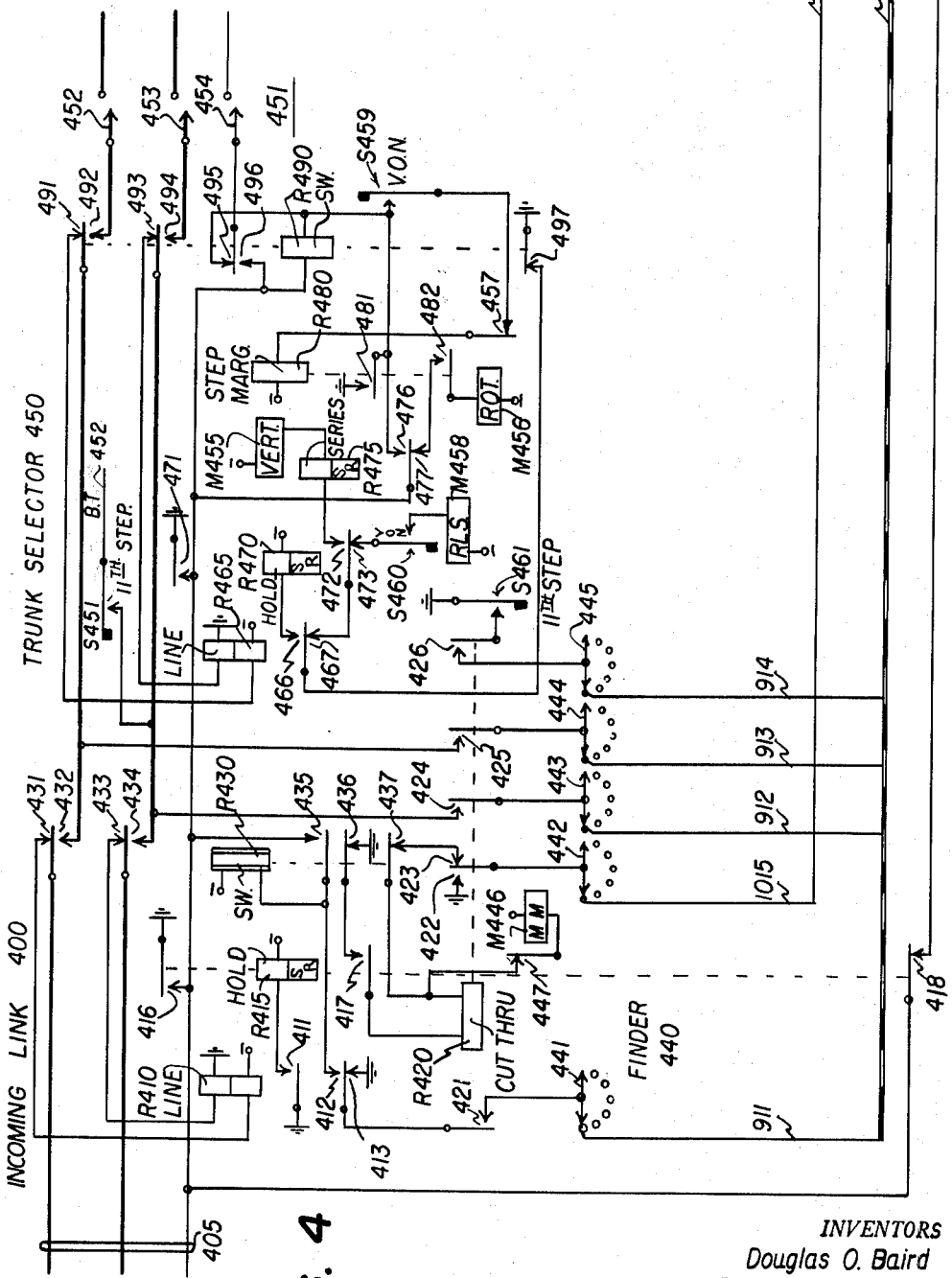
Figure 10:
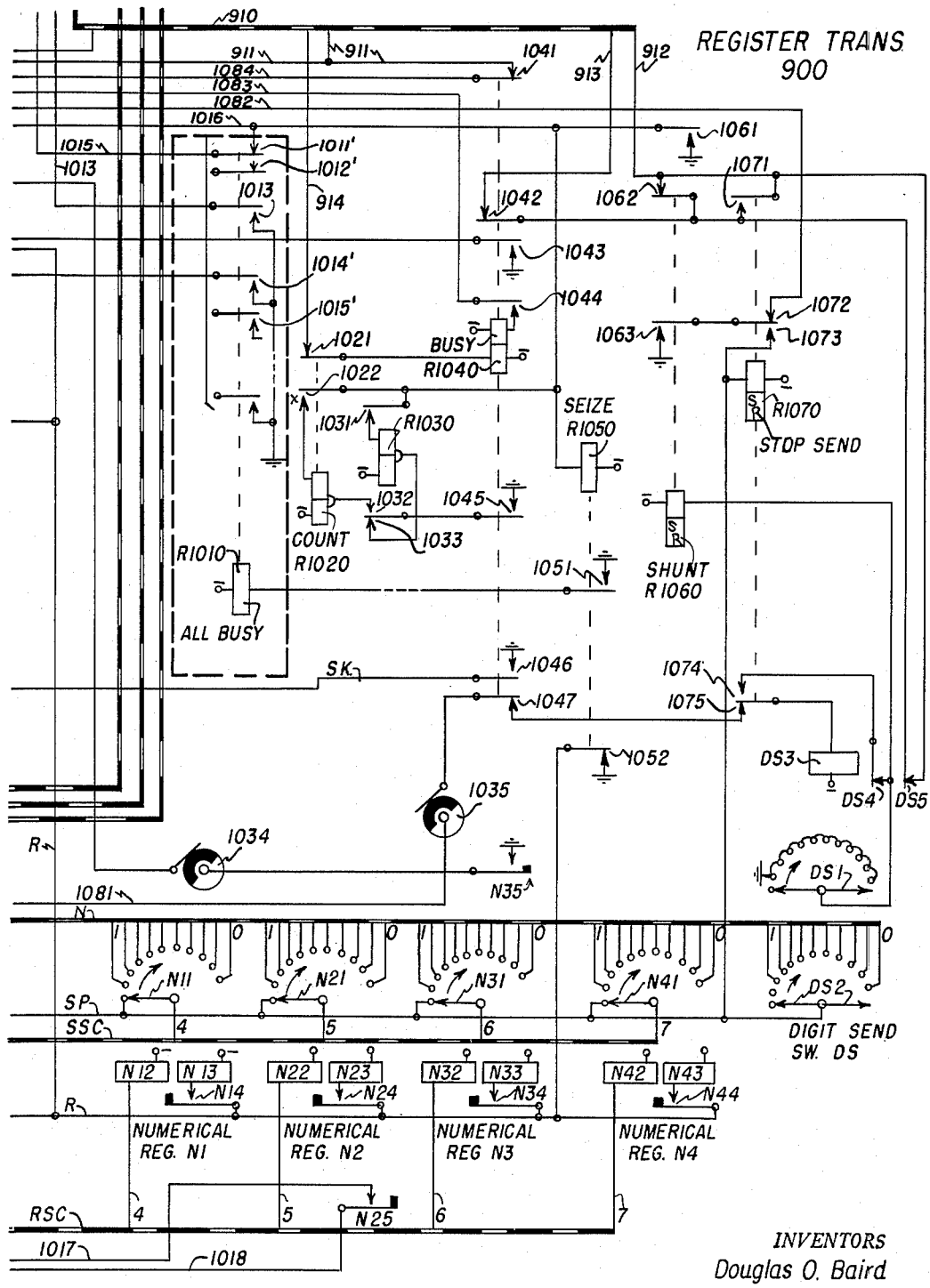
Figure 9:
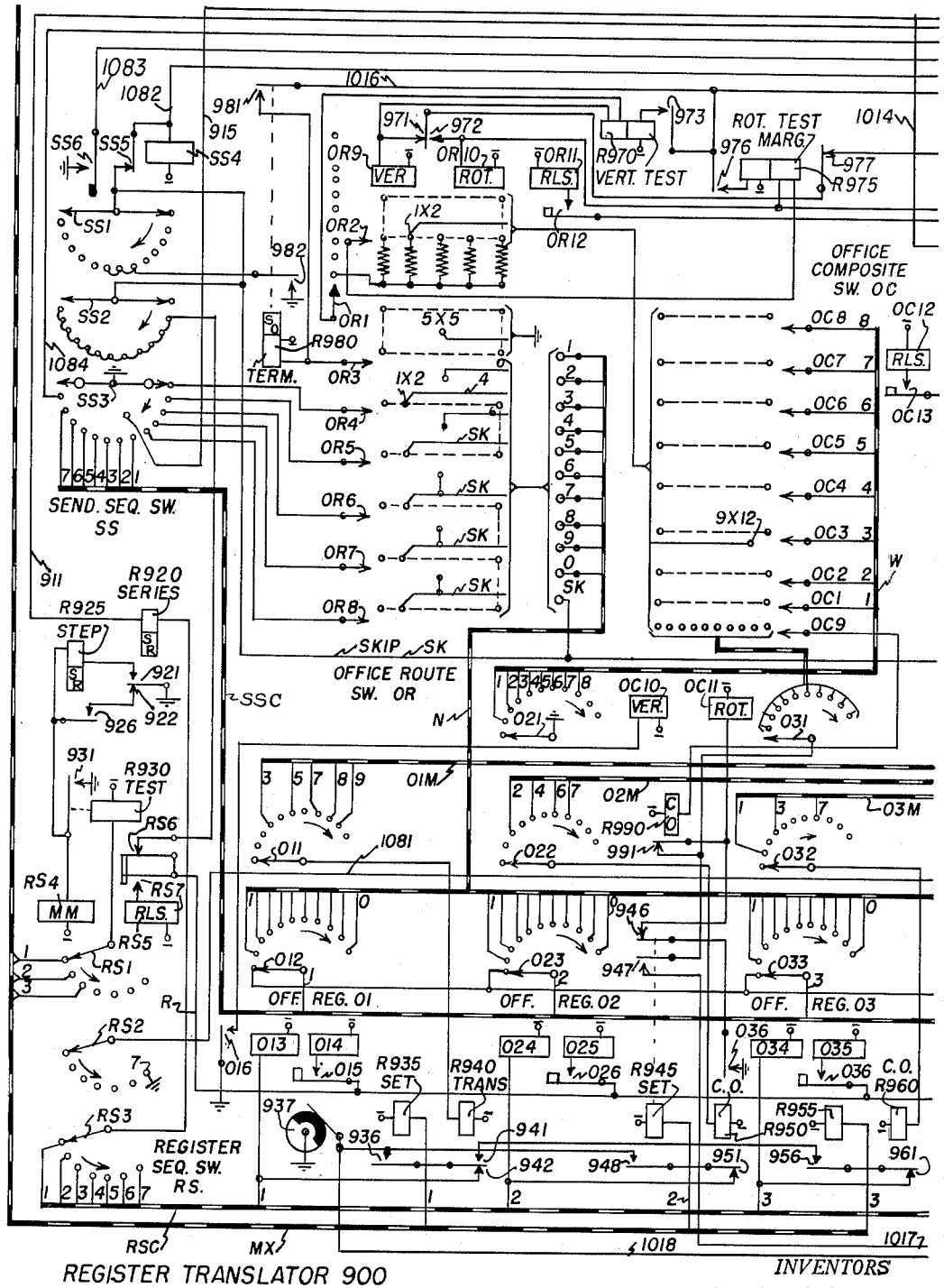

More particularly, Fig. 3 illustrates the details of one of the trunk circuits incorporated in the office noted; the left-hand side of Fig. 4 illustrates the details of one of the incoming links incorporated in the office noted; the right-hand side of Fig. 4 illustrates the details of one of the trunk selectors incorporated in the office noted; Figs. 5, 6, 7 and 8 illustrate the details of one of the outgoing links incorporated in the office noted; Figs. 9 and 10 illustrate the details of one of the register translators incorporated in the office noted; and Fig. 11 illustrates the details of one of the trunk selector repeaters incorporated in the office noted.

Referring now to Fig. 1, the telephone system there illustrated serves an area comprising a number of offices, five of which are illustrated as: RAvenswood 3, RAndolph 6, WAbash 2, LIncoln 8 and SPring 9. Each of the offices noted is of the automatic type and serves a maximum of 10,000 subscriber lines; and each of the offices comprises apparatus for establishing local connections between the various subscriber substations therein, apparatus for extending connections from the various subscriber substations therein to the other offices, apparatus for completing connections extended from the various other offices to the subscriber substations therein, and apparatus for extending tandem connections between various of the other offices. Also each of the offices comprises equipment for automatically producing toll recordings in conjunction with completed toll connections involving calling subscriber substations therein.

The RA3 office and the RA6 office are interconnected by a group of trunk lines including the trunk line 310; the RA6 and the WA2 office are interconnected by a group of trunk lines including the trunk line 211; the RA3 office and the LI8 office are interconnected by a group of trunk lines including the trunk line 111; the LI8 office and the SP9 office are interconnected by a group of trunk lines including the trunk line 112; the SP9 and the WA2 office are interconnected by a group of trunk lines including the trunk line 113; the RA6 office and the LI8 office are interconnected by a group of trunk lines including the trunk line 221; and the RA6 office and the SP9 office are interconnected by a group of trunk lines including the trunk line 231. In the telephone system and with reference to the RA6 office, the group of trunk lines 310, etc., comprises a first choice route to the RA3 office; while the group of trunk lines 221, etc., comprises a second choice route to the RA3 office via the LI8 office in tandem relation. Similarly with reference to the RA6 office, the group of trunk lines 211, etc., comprises a first choice route to the WA2 office; while the group of trunk lines 231, etc., comprises a second choice route to the WA2 office via the SP9 office in tandem relation.

Referring now to Fig. 2 in the RA6 office, two of the subscriber substations T1 and T2 are illustrated as being connected to the subscriber lines having the respective directory numbers 7930 and 7981. Each of the subscriber lines is provided with a line circuit individual thereto, the line circuits 501 and 502 being individual to the respective subscriber lines 7930 and 7981. Also the RA6 office comprises a local switch train including a plurality of finder-first selector groups respectively associated with the individual hundred line groups of subscriber lines. The group of finder-first selectors associated with the 7900 group of subscriber lines includes the finder-first selector consisting of the finder 504 and the first selector 505. Accordingly the finder 504 has access to the 7900 group of subscriber lines including the subscriber lines 7930 and 7981 illustrated. Also this group of finder-first selectors is provided with an associated distributor 503 that is operatively associated with the line circuits 501, 502, etc., of the subscriber lines in the 7900 group.

Further the local switch train comprises appropriate groups of second selectors, the seventh group of second selectors including the second selector 506 that is accessible via the associated trunk 521 to the first selectors 505, etc. Also the local switch train comprises appropriate groups of third selectors, the second group of third selectors including the third selector 507 that is accessible via the associated trunk 522 to the second selectors 506, etc. Also the local switch train comprises appropriate groups of fourth selectors, the sixth group of fourth selectors including the fourth selector 508 that is accessible via the associated trunk 523 to the third selectors 507, etc. Also the local switch train comprises appropriate groups of fifth selectors, the seventh group of fifth selectors including the fifth selector 509 that is accessible via the associated trunk 524 to the fourth selectors 508, etc. Finally the local switch train comprises appropriate groups of connectors, the ninth group of connectors including the ninth connector 510 that is accessible via the associated trunk 525 to the fifth selectors 509, etc. The connectors 510, etc., in turn, have access to the 7900 group of subscriber lines including the subscriber lines 7930 and 7981.

Also in the RA6 office, there are provided an appropriate group of outgoing links 600, etc., that are accessible via associated trunks 610, etc., to the various first selectors 505, etc., to the various second selectors 506, etc., and to the various third selectors 507, etc. Specifically in the example illustrated, the trunk 610 extending to the outgoing link 600 is accessible in the third, fifth, eighth and ninth levels of the first selectors 505, etc., is accessible in the fourth, sixth and seventh levels of the second selectors 506, etc., and is accessible in the first, third and seventh levels of the third selector 507, etc. Further there is provided a manual and intercept operator position 511 that is accessible in the first, second, fourth, sixth and tenth levels of the first selectors 505, etc., that is accessible in the first, third, fifth, eighth, ninth and tenth levels of the second selectors 506, etc., and that is accessible in the second, fourth, fifth, eighth, ninth and tenth levels of the third selectors 507, etc.

In the RA6 office, the trunk lines 310, 211, 221, 231, etc., terminate in trunk circuits 300, 212, 222, 232, etc., individual thereto that are provided with individual incoming trunks 315, 214, 224, 234, etc., as well as individual outgoing line switches 370, 213, 223, 233, etc. A group of incoming links 400, etc., is provided that is accessible via trunks 405, etc., to the various line switches 370, 213, 223, 233, etc. Each of the outgoing links 600, etc., is provided with an associated trunk selector repeater 1100, etc.; and each of the incoming links 400, etc., is provided with an associated trunk selector 450, etc. The trunk selector repeaters 1100, etc., and the trunk selectors 450, etc., in turn, have access to the various incoming trunks 315, 214, 224, 234, etc., extending to the respective trunk circuits 300, 212, 222, 232, etc. Finally the switch train in the RA6 office comprises a group of office selectors 240, etc., that are accessible via individual trunks 241, etc., to the trunk selectors 450, etc.; the office selectors 240, etc., having access to the various groups of fourth selectors 508, etc., via the associated trunks 523, etc. As illustrated, the trunk selector repeaters 1100, etc., and the trunk selectors 450, etc., have access to the trunks 315, 214, 224 and 234 in the respective second, fourth, sixth and eighth levels thereof; and the trunk selectors 450, etc., have access to the trunk 241 in the tenth levels thereof.

The RA6 office comprises toll recording equipment, including a detector 520 having access to each line circuit 501, 502, etc., therein, as well as a finder 530 having access to each of the outgoing links 600, etc. Moreover the detector 520 is accessible to each of the trunk selector repeaters 1100, etc. Also a tabulator allotter 740 is provided that is accessible to each of the local access circuits 600, etc., and has access via a finder 741 to each of a plurality of tabulators 742, etc. Each of the tabulators 742, etc., is provided with a finder 744, etc., having access to each of the outgoing links 600, etc. Finally a perforator 760 is provided that is accessible to each of the tabulators 742, etc.; which perforator 760 is provided with a finder 761 having access to each of the tabulators 742, etc.

In view of the foregoing, it will be understood that each of the other offices RA3, etc., is provided with apparatus substantially identical to that described above in conjunction with the RA6 office.

*Section 2.—The apparatus incorporated in the telephone system*

In the RA6 office, each of the subscriber substation T1, etc., is provided with conventional subscriber substation apparatus, including a telephone instrument, a dial mechanism, and a ringer. Also each of the line circuits 501, etc., and each of the distributors 503, etc., may be of conventional types. Preferably the finders 504, etc., the various selectors 505, 506, 507, 508, 509, 240, etc., and the connectors 510, etc., are of conventional Strowger types.

The trunk circuits 300, etc., may be identical; and the trunk circuit 300, illustrated in Fig. 3, comprises a relay group, including two switch relays R320 and R340, a line relay R325, two series relays R330 and R345, two hold relays R335 and R350 and a switchthrough relay R360. Also the line switch 370 individual to the trunk circuit 300 comprises three wipers 371, 372 and 373 having individually associated contact banks, and a rotary magnet M374 for driving the wipers noted step by step in the clockwise direction.

The incoming links 400, etc., may be identical; and the incoming link 400, illustrated in Fig. 4, comprises a relay group, including a line relay R410, a hold relay R415, a cut-through relay R420, and a switch relay R430.

Also the finder 440 individual to the incoming link 400 comprises five wipers 441, 442, 443, 444 and 445 having individually associated contact banks, and a rotary magnet M446 for driving the wipers noted step by step in the clockwise direction.

The trunk selectors 450, etc., may be identical; and the trunk selectors 450, illustrated in Fig. 4, comprises a Strowger mechanism 451, including a wiper carriage carrying three wipers 452, 453 and 454, a vertical magnet M455 for driving the wiper carriage step by step in the vertical direction, a rotary magnet M456 for driving the wiper carriage step by step in the rotary direction, and a release magnet M458 for releasing the wiper carriage and for causing it to be returned to its normal rotary and vertical positions. Also associated with the wiper carriage are four sets of switch springs S459, S460, S451 and S461. The sets of switch springs S459 and S460 are operated when the wiper carriage is driven one step in the vertical direction out of its normal vertical position; and the sets of switch springs S451 and S461 are operated when the wiper carriage is driven eleven steps in the rotary direction away from its normal rotary position. Also the trunk selector 450 comprises a relay group, including a line relay R465, a hold relay R470, a series relay R475, a step relay R480, and a switch relay R490.

The outgoing links 600, etc., may be identical; and the outgoing link 600 illustrated in Figs. 5, 6, 7 and 8, comprises a relay group, including a line relay R620, a hold relay R630, a switch relay R640, a cut-through relay R650, a gang relay R710, a number of gang relays R660, etc.; individual to the register translators 900, etc., a number of gang relays R730, etc., individual to the tabulators 742, etc., a step relay R810, a series relay R820, a release relay R720, and a number of mark relays 3M, 5M, 8M, 9M, 74M, 76M, 77M, 721M, 723M and 727M. More particularly the mark relays consist of one digit mark relay corresponding to each level in the first selectors 505, etc., in which the trunk 610 is accessible; whereby the one-digit mark relays 3M, 5M, 8M and 9M are provided and respectively correspond to the third, fifth, eighth and ninth levels of the first selectors noted. Also the mark relays consists of a two-digit combination mark relay corresponding to each level in the second selectors 506, etc., in which the trunk 610 is accessible; whereby the two-digit combination mark relays 74M, 76M and 77M are provided and respectivley correspond to the fourth, sixth and seventh levels of the second selectors noted. Finally the mark relays consist of a three-digit combination mark relay corresponding to each level in the third selectors 507, etc., in which the trunk 610 is accessible; whereby the three-digit combination mark relays 721M, 723M and 727M are provided and respectively correspond to the first, third and seventh levels of the third selectors noted.

In this connection, it is pointed out that the trunk 610 comprises a negative conductor 611, a positive conductor 612, and a test conductor 613 that are common to the various first selectors 505, etc., to the various second selectors 506, etc., and to the various third selectors 507, etc. However the trunk 610 also comprises individual mark conductors 3MC, 5MC, 8MC, 9MC, 74MC, 76MC, 77MC, 721MC, 723MC and 727MC that are individual to the corresponding mark relays 3M, 5M, 8M, 9M, 74M, 76M, 77M, 721M, 723M and 727M. Thus the mark conductors 3MC, 5MC, 8MC, 9MC, respectively terminate in the third, fifth, eighth and ninth levels of the first selectors 505, etc.; the mark conductors 74MC, 76MC and 77MC respectively terminate in the fourth, sixth and seventh levels of the second selectors 506, etc.; and the mark conductors 721MC, 723MC and 727MC respectively terminate in the first, third and seventh levels of the third selectors 507, etc.

Also the outgoing link 600 comprises four groups of WXYZ storage relays M700, C700, D700 and U700 that are employed for the purpose of storing the respective thousand, hundred, ten and unit digits of the directory number of a calling subscriber line connected thereto and identified by the detector 520, as well as seven storage switches R1, R2, R3, R4, R5, R6 and R7 for respectively storing the three digits of the called office code and the four digits of the called line number involved in a connection routed via the outgoing link 600, and a register sequence switch RSS. The storage switch R1 is of the minor type, including two wipers R11 and R12 provided with individually associated contact banks, a rotary magnet R13 for driving the wipers noted step by step in the clockwise direction away from their home positions, a release magnet R14 for releasing the wipers noted and for causing them to be returned back into their home positions, and a set of switch springs R15 that is operated when the wipers noted are rotated out of their home positions. The storage switches R2, R3, R4, R5, R6 and R7 are identical to the storage switch R1 and respectively comprise the pairs of wipers R21, R22, and R31, R32, and R41, R42 and R51, R52 and R61, R62 and R71, R72, the operate magnets R23, R33, R43, R53, R63 and R73, the release magnets R24, R34, R44, R54, R64 and R74, and the sets of switch springs R25, R35, R45, R55, R65 and R75. The storage switches R1 to R7, inclusive, store the corresponding digits of the called office code and the called line number in WXYZ form. The register sequence switch RSS is of the minor type, including a single wiper RSS1 provided with an associated contact bank, a rotary magnet RSS2 for driving the wiper noted step by step in the clockwise direction away from its home position, a release magnet RSS3 for releasing the wiper noted and for causing it to be returned back into its home position, and a set of switch springs RSS4 that is operated when the wiper noted is rotated out of its home position.

Finally the outgoing link 600 comprises a timer 780 that may be of a conventional type, including a start relay R781, a hold relay R783, and two storage groups, not shown, for storing on a WXYZ basis the ten digit of time and the unit digit of time, as explained more fully hereinafter.

Figure 5:
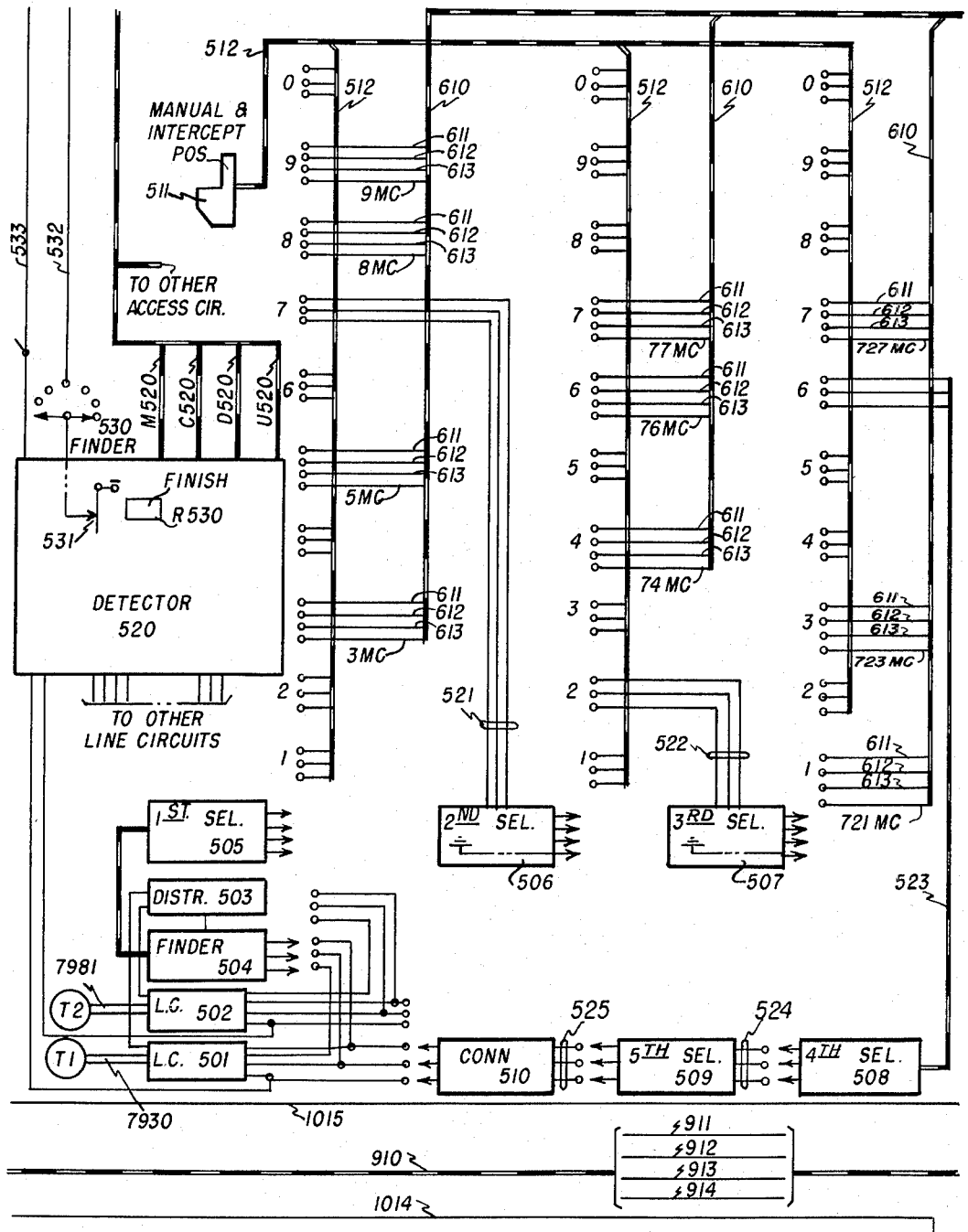

In the RA6 office, the manual and intercept operator position 511 may be of the convention manual dial type; the detector 520 may be of the general connection and arrangement of that disclosed in the copending application of John E. Ostline, Serial No. 79,677, filed March 4, 1949; the tabulator allotter 740 and the tabulator 742 may be of the respective connections and arrangements of those disclosed in the copending application of John E. Ostline, Serial No. 75,985, filed February 12, 1949; and the perforator 760 may be of the construction and arrangement of that disclosed in the copending application of John E. Ostline, Serial No. 207,092, filed January 22, 1951. As indicated in Fig. 5, the detector 520 includes a finish relay R530; and the associated finder 530 is of the rotary type, including a single wiper. As indicated in Fig. 7, the tabulator 742 includes a start relay R750, a finish relay R755, and a gang relay R770; and the associated finder 744 is of the rotary type, including two wipers 745 and 746. As indicated in Fig. 7, the perforator 760 includes a start relay R765; and the associated finder 761 is of the rotary type, including two wipers 762 and 763. Also as indicated in Fig. 7, the finder 741 associated with the tabulator allotter is of the rotary type, including a single wiper.

The register translators 900, etc., may be identical; and the register translator 900, illustrated in Figs. 9 and 10, comprises a relay group, including a step relay R925, a series relay R920, a test relay R930, a terminate relay R980, three set relays R935, R945 and R955, a transfer relay R940, three cutoff relays R950, R960 and R990, a vertical test relay R970, a rotary test relay R975, two count relays R1020 and R1030, a busy relay R1040, a seize relay R1050, a shunt relay R1060, and a stop-send relay R1070. Also the register translator 900 comprises a register sequence switch RS of the minor type, a send sequence switch SS of the rotary type, a digit-send switch DS of the rotary type, three office code registers O1, O2 and O3 of the minor type, four numerical switches N1, N2, N3 and N4 of the minor type, an office composite switch OC of the Strowger type, and an office route switch OR of the Strowger type.

The send switch SS includes three wipers SS1, SS2 and SS3 provided with individually associated contact banks, a rotary magnet SS4 for driving the wipers noted step by step in the clockwise direction, and a set of switch springs SS6 that is operated when the wipers noted are driven out of their home positions. The register sequence switch RS includes three wipers RS1, RS2 and RS3 provided with individually associated contact banks, a rotary magnet RS4 for driving the wipers noted step by step in the counterclockwise direction, a release magnet RS5 for releasing the wipers noted and for causing them to be returned back into their home positions, and two sets of switch springs RS6 and RS7 that are operated when the wipers noted are driven out of their home positions. The digit-send switch DS includes two wipers DS1 and DS2 provided with individually associated contact banks, and a rotary magnet DS3 for operating the wipers noted step by step in the clockwise direction. The office register O1 includes two wipers O11 and O12 provided with individually associated contact banks, a rotary magnet O13 for driving the wipers noted step by step in the clockwise direction, a release magnet O14 for releasing the wipers noted and for causing them to be returned back into their home positions, and a set of switch springs O15 that is operated when the wipers noted are driven out of their home positions. The office register O2 includes three wipers O21, O22 and O23 provided with individually associated contact banks, a rotary magnet O24 for driving the wipers noted step by step in the clockwise direction, a release magnet O25 for releasing the wipers noted and for causing them to be returned back into their home positions, and a set of switch springs O26 that is operated when the wipers noted are driven out of their home positions. The office register O3 includes three wipers O31, O32 and O33 provided with individually associated contact banks, a rotary magnet O34 for driving the wipers noted step by step in the clockwise direction, a release magnet O35 for releasing the wipers noted and for causing them to be returned back into their home positions, and a set of switch springs O36 that is operated when the wipers noted are driven out of their home positions. The numerical register N1, includes a single wiper N11 provided with an associated contact bank, a rotary magnet N12 for driving the wipers noted step by step in the clockwise direction, a release magnet N13 for releasing the wiper noted and for causing it to be returned back into its home position, and a set of switch springs N14 that is operated when the wiper noted is driven out of its home position. The numerical register N2 includes a single wiper N21 provided with an associated contact bank, a rotary magnet N22 for driving the wiper noted step by step in the clockwise direction, a release magnet N23 for releasing the wiper noted and for causing it to be returned back into its home position, and two sets of switch springs N24 and N25 that are operated when the wiper noted is driven out of its home position. The numerical register N3 includes a single wiper N31 provided with an associated contact bank, a rotary magnet N32 for driving the wiper noted step by step in the clockwise direction, a release magnet N33 for releasing the wiper noted and for causing it to be returned back into its home position, and two sets of switch springs N34 and N35 that are operated when the wiper noted is driven out of its home position. The numerical register N4 includes a single wiper N41 provided with an associated contact bank, a rotary magnet N42 for driving the wiper noted step by step in the clockwise direction, a release magnet N43 for releasing the wiper noted and for causing it to be returned back into its home position, and a set of switch springs N44 that is operated when the wiper noted is driven out of its home position.

The office composite switch OC comprises a wiper carriage carrying eight wipers OC1 to OC8, inclusive, capable of both vertical and rotary movements, as well as a wiper OC9 capable of only rotary movement, a vertical magnet OC10 for driving the wiper carriage step by step in the vertical direction, a rotary magnet OC11 for driving the wiper carriage step by step in the rotary direction, and a release magnet OC12 for releasing the wiper carriage and for causing it to be returned into its normal rotary and vertical positions. Also a set of switch springs OC13 is operatively associated with the wiper carriage and operated when the wiper carriage is moved one step in the vertical direction away from its normal vertical position. The office route switch OR comprises a wiper carriage carrying six wipers OR3 to OR8, inclusive, capable of both vertical and rotary movements, as well as a wiper OR1 capable of only vertical movement, and a wiper OR2 capable of only rotary movement, a vertical magnet OR9 for driving the wiper carriage step by step in the vertical direction away from its normal vertical position, a rotary magnet OR10 for driving the wiper carriage step by step in the rotary direction away from its normal rotary position, and a release magnet OR11 for releasing the wiper carriage and for causing it to be returned back into its normal rotary and vertical positions. Also associated with the wiper carriage is a set of switch springs OR12 that is operated when the wiper carriage is moved in the vertical direction away from its normal vertical position.

Finally the register translator 900 comprises an impulse sending wheel 1035 that is operated by a motor, not shown, and adapted to send approximately ten impulses per second, as well as two impulsing wheels 1034 and 937 that are operated by a motor, not shown, and adapted to send approximately 15 to 20 impulses per second.

As illustrated in Fig. 10, an all busy relay R1010 is commonly associated with the register translators 900, etc., and operated via an associated chain circuit when all of the register translators 900, etc., are busy, for a purpose more fully explained hereinafter.

The trunk selector repeaters 1100, etc., may be identical; and the trunk selector repeater 1100, illustrated in Fig. 11, comprises a Strowger mechanism 1110, including a wiper carriage carrying three wipers 1111, 1112 and 1113, a vertical magnet M1114 for driving the wiper carriage step by step in the vertical direction, a rotary magnet M1115 for driving the wiper carriage step by step in the rotary direction, and a release magnet M1117 for releasing the wiper carriage and for causing it to be returned into its normal rotary and vertical positions. Also associated with the wiper carriage are five sets of switch springs S1105, S1106, S1120, S1119, and S1118. The sets of switch springs S1120, S1119 and S1118 are operated when the wiper carriage is driven one step in the vertical direction out of its normal vertical position; and the sets of switch springs S1105 and S1106 are operated when the wiper carriage is driven eleven steps in the rotary direction away form its normal rotary position. Also the trunk selector repeater 1100 comprises a repeater 1130, including coils 1131, 1132, 1133 and 1134; and a relay group, including a register relay R1135, a detect relay R1140, a tabulator relay R1145, a line relay R1150, a hold relay R1155, an answer relay R1160, a dial relay R1165, a series relay R1170, a step relay R1175, a switch relay R1180, a pickup relay R1190 and a timer relay R1195.

The connection and arrangement of the apparatus incorporated in the telephone system will best be understood from the following description of the setting up of various telephone connections therein.

Section 3.—Local calls in the RA6 office

Considering now the extension of a local call from a calling subscriber substation to a called subscriber substation in the RA6 office, such, for example, as a connection from the calling subscriber substation T1 to the called subscriber substation T2, the subscriber at the calling subscriber substation T1 initiates the call and then dials the called office code RA6 (726) followed by the numerical designation 7981 of the subscriber line extending to the called subscriber substation T2. When the call is initiated at the calling subscriber substation T1, the line circuit 501 individually associated with the subscriber line 7930 is controlled in order to govern the distributor 503 so as to effect the assignment of an idle finder-first selector link. For example, the distributor 503 may assign the link illustrated consisting of the finder 504 and the first selector 505, whereby the finder 504 then operates to find the calling subscriber line 7930 and to control the line circuit 501 in order to mark the subscriber line 7930 as busy to the connector 510, etc., having access thereto. The first selector 505 responds to the first office code digit 7 to select the corresponding group of second selectors and then to select an idle second selector in the selected group. For example, the first selector 505 may select the trunk 521 extending to the second selector 506. The second selector 506 responds to the second office code digit 2 to select the corresponding group of third selectors and then to select an idle third selector in the selected group. For example the second selector 506 may select the trunk 522 extending to the third selector 507. The third selector 507 responds to the third office code digit 6 to select the corresponding group of fourth selectors and then to select an idle fourth selector in the selected group. For example, the third selector 507 may select the trunk 523 extending to the fourth selector 508. The fourth selector 508 responds to the first numerical digit 7 to select the corresponding group of fifth selectors and then to select an idle fifth selector in the selected group. For example, the fourth selector 508 may select the trunk 524 extending to the fifth selector 509. The fifth selector 509 responds to the second numerical digit 9 to select the corresponding group of connectors and then to select an idle connector in the selected group. For example, the fifth selector 509 may select the trunk 525 extending to the connector 510. The connector 510 responds to the third numerical digit 8 and the fourth numerical digit 1 to select the subscriber line 7981 extending to the called subscriber substation T2.

The subsequent operation of the connector 510 depends upon the idle or busy condition of the called subscriber substation T2 at this time. First assuming that the called subscriber substation T2 is busy, the connector 510 operates to return busy tone current over the connection back to the calling subscriber substation T1, whereby the subscriber at the calling subscriber substation T1 releases the connection in a conventional manner. Now assuming that the called subscriber substation T2 is idle, the connector 510 operates to project ringing current over the called subscriber line 7981 and to return ring-back tone current over the connection to the calling subscriber substation T1. Subsequently when the subscriber at the called subscriber substation T2 answers the call, the connector 510 operates to interrupt the projection of ringing current over the subscriber line 7981, to interrupt the return of ring-back tone current over the connection to the calling subscriber substation T1, and to reverse the polarity of battery over the connection between the connector 510 and the calling subscriber substation T1; which reversal of battery potential over the connection noted may be employed in the line circuit 501 individual to the calling subscriber line 7930 for metering purposes in a conventional manner. At the conclusion of the established connection, the subscribers at the calling and called subscriber substations T1 and T2 disconnect, whereby the apparatus involved in the established connection is released and rendered available for further use.

In view of the foregoing description of the mode of establishing a local connection between a calling subscriber substation and a called subscriber substation in the RA6 office, it will be understood that in a substantially identical manner, local connections may be completed between calling and called subscriber substations in the other offices RA3, WA2, etc.

*Section 4.—Operator and intercepted calls in the RA6 office*

In order to complete a connection from a calling subscriber substation in the RA6 office to the manual and intercept operator position 511 therein, the subscriber at the calling subscriber substation, such, for example, as the subscriber substation T1, initiates the call and then dials the single digit "0." Also it will be observed that the other single digits 1, 2, 4 and 6 bring about the interception of the call at the manual and intercept operator position 511. Furthermore the two-digit combinations 71, 73, 75, 78, 79 and 70 bring about the interception of the call at the local and intercept operator position 511. Finally the three-digit combinations 722, 724, 725, 728, 729 and 720 bring about the interception of the call at the manual and intercept operator position 511. This interception of the calls noted above takes place by virtue of the circumstance that the trunks 512, etc., extending to the position 511 commonly terminate in the first, second, fourth, sixth and tenth levels of the first selectors 505, etc., commonly terminate in the first, third, fifth, eighth, ninth and tenth levels of the second selectors 506, etc.; and commonly terminate before the second, fourth, fifth, eighth, ninth and tenth levels of the third selectors 507, etc. The answering of a call at the operator position 511 is entirely conventional; and the subsequent release of the established connection thereto from the calling subscriber substation T1 takes place when the subscriber at the calling subscriber substation T1 disconnects.

In view of the foregoing description of operator and intercepted calls in the RA6 office, it will be understood that similar calls in the other offices RA3, WA2, etc., may be completed in an analagous manner.

*Section 5.—A call from a subscriber substation in the RA6 office to a subscriber substation in the WA2 office*

Considering the extension of a call from a subscriber substation in the RA6 office to a subscriber substation in the WA2 office, such, for example, as a connection from the calling subscriber substation T1 in the RA6 office to the subscriber substation terminated by the subscriber line 1234 in the WA2 office, the subscriber at the calling subscriber substation T1 initiates the call and then dials the called office code WA2 (922) followed by the numerical designation 1234 of the called subscriber line. When the call is initiated at the calling subscriber substation T1, the finder-first selector link illustrated may be employed; whereby the finder 504 finds the calling subscriber line 7930 and the first selector 505 responds to the first office code digit 9. More particularly the first selector 505 selects the corresponding group of trunks, including the trunk 610, and then an idle trunk in the selected group. Specifically the first selector 505 may select the trunk 610 extending to the outgoing link 600, the trunk 610 being marked as idle by the absence of ground potential upon the control conductor 613 thereof. When the first selector 505 seizes the trunk 610, it applies ground potential to the control conductor 613 thereof, as well as to the marking conductor 9MC thereof, and completes a loop circuit between the calling subscriber substation T1 and the upper and lower windings of the line relay R620 in the outgoing link 600 via the line conductors 611 and 612 of the trunk 610. Accordingly the line relay R620 operates to complete, at the contacts 621, a circuit for operating the hold relay R630. Upon operating the hold relay R630 completes, at the contacts 631, a path, including the conductor 663 and the contacts 1142, for applying ground potential to the control conductor 613 of the trunk 610, thereby to mark the trunk 610 as busy before the various first selectors 505, etc., second selectors 506, etc., and third selectors 507, etc. The application of ground potential in the first selector 505 to the marking conductor 9MC of the trunk 610 completes a chain circuit for operating the mark relay 9M in the outgoing link 600. The chain circuit for energizing the mark relay 9M includes the contacts 2 thereof, as well as the contacts 3 of each of the other mark relays 3M, etc. Upon operating the mark relay 9M completes, at the contacts 1 thereof, a holding circuit, including the contacts 646 for energizing the winding thereof; and interrupts, at the contacts 3 thereof, a common point in the chain circuit for energizing the other mark relays 3M, etc. Thus operation of one of the mark relays 9M, etc., positively prevents operation of any of the other mark relays 3M, etc., in the outgoing link 600.

Considering now the normal cooperation between the outgoing link 600 and the various register translators 900, etc., it is noted that the finder 670 individual to the outgoing link 600 preselects an idle one of the register translators 900, etc., prior to seizure of the outgoing link 600 by one of the selectors 505, etc., 506, etc., 507, etc., having access thereto. Specifically battery potential is applied in the outgoing link 600 via the rotary magnet M673, the contacts 674, 648 and 651 to the wiper 671 of the finder 670; and the wiper 671 engages one of the control conductors 1015, etc., extending to one of the register translators 900, etc. In the present example, it is assumed that the register translator 900 is idle, whereby battery potential is applied therein via the winding of the seize relay R1050, the conductor 1016 and the contacts 1011' to the control conductor 1015 thereof appearing before the finder 670; however in the event the register translator 900 becomes busy before the outgoing link 600 is seized, ground potential is applied to the control conductor 1015 thereof, whereby a "buzzer" circuit substantially identical to that traced above is completed for operating the rotary magnet M673 of the finder 670 so as to operate the wiper 671 thereof to disengage the control conductor 1015 extending to the particular register translator 900 and to engage a control conductor extending to an idle register translator, as evidenced by the presence of battery potential thereon. When the wiper 671 engages a control conductor extending to an idle one of the register translators the presence of battery potential upon the control conductor thereof effects short-circuiting of the rotary magnet M673 of the finder 670 and the consequent arresting of operation thereof so that the finder 670 preselects the idle register translator noted to be used the next time the outgoing link 600 is seized.

In conjunction with the operation of the register translator 900, etc., it is further noted that when all of the register translators 900, etc., are busy, a chain circuit, including the contacts 1051, etc., is completed for operating the all-busy relay R1010. Upon operating the all-busy relay R1010 interrupts, at the contacts 1011', etc., the various connections for applying ground potential to the control conductors 1015, etc., appearing before the various finders 670, etc., so as to prevent useless operation of the finder 670, etc., at this time, when all of the register translators 900, etc., are busy. Further the all-busy relay R1010 completes, at the contacts 1013', etc., paths for applying ground potential to the busy conductors 1013, etc., extending to the various outgoing links 600, etc. The application of ground potential to the busy conductor 1013 completes a path, including the contacts 633, for applying ground potential to the control conductor 613 of the trunk 610 in order artificially to mark the trunk 610 and the outgoing link 600 as busy to the various selectors 505, etc., when all of the register translators 900, etc., are busy.

Continuing now with the operation of the outgoing links 600, upon operating the hold relay R630 completes at the contacts 632, a circuit, including the contacts 647 and 674, for energizing in series relation the winding of the cut-through relay R650 and the rotary magnet M673 of the finder 670; whereby the cut-through relay R650 operates, but the rotary magnet M673 does not operate due to the resistance of the winding of the cut-through relay R650. Upon operating the cut-through relay R650 interrupts, at the contacts 651, the normal connection between the rotary magnet M673 and the wiper 671 of the finder 670; and completes, at the contacts 652, a direct path for applying ground potential to the wiper 671 of the finder 670 and consequently to the control conductor 1015 extending to the selected register translator 900 in order to mark the register translator 900 as busy to the other finders having access thereto. Finally the cut-through relay R650 completes, at the contacts 653, a path for applying ground potential to the wiper 672 of the finder 670 so as to effect operation of the gang relay R660 in the outgoing links 600 and corresponding to the register translator 900.

Upon operating the gang relay R660 completes at its contacts, connections between the various conductors 662, etc., in the outgoing link 600 and the various conductors 912, etc., extending to the register translator 900. Specifically the application of ground potential to the control conductor 1015 completes a circuit, including the contacts 1011' and the conductor 1016, for operating the seize relay R1050 in the register translator 900. Upon operating the seize relay R1050 prepares, at the contacts 1051, a point in the previously-mentioned chain circuit for operating the all-busy relay R1010; and interrupts, at the contacts 1052, a path for applying ground potential to the release conductor R in the register translator 900. At this time, the conductors 912 and 913 in the cable 910 are connected together at the multiple contacts 1062 and DS5 and thence via the contacts of the gang relay R660 to the line conductors 661 and 662 extending between the link 600 and the trunk selector repeater 1100; whereby the upper and lower windings of the line relay R1150 in the trunk selector repeater 1100 are energized over the loop circuit noted causing the latter relay to operate.

At this time the operated mark relay 9M completes, at its contacts 4, a path for applying ground potential to the first skip conductor in the cable MX extending to the register translator 900 so as to effect operation of the set relay R935 and the test relay R930. The circuit for operating the test relay R930 includes the wiper RS1 of the register sequence switch RS and the engaged first or home contact in the associated contact bank. Upon operating the test relay R930 completes, at the contacts 931, a circuit for operating the rotary magnet RS4 of the register sequence switch RS; whereby the wipers RS1, etc., are driven to engage the second contacts in the associated contact banks. The wiper RS3 of the register sequence switch RS in its home or first position selects the first conductor in the cable RSC extending to the office register O1; and the wiper RS3 in its second position selects the second conductor in the cable RSC extending to the office register O2. Thus the application of ground potential to the first skip conductor in the cable MX causes the register sequence switch RS normally selecting the office register O1, to skip the first office register O1 and to select the second office register O2. When the wiper RS1 of the register sequence switch RS disengages the home or first contact in the associated contact bank, the circuit for retaining operated the test relay R930 is interrupted causing the latter relay to restore and effect the restoration of the rotary magnet RS4. Also the operated mark relay 9MC completes, at its contacts 7, a path for applying ground potential to the ninth conductor in the cable O1M extending to the first office register O1. Upon operating the set relay R935 completes, at the contacts 936, a circuit, including the contacts 942 and the impulsing wheel 937, for operating the rotary magnet O13 of the first office register O1; whereby the magnet O13 operates intermittently driving the wipers O11, etc., of the first office register O1 step by step in the clockwise direction until the wiper O11 engages the ninth contact in the associated contact bank terminating the ninth conductor in the marking cable O1M having ground potential thereon; whereby the transfer relay R940 is operated. Upon operating the transfer relay R940 interrupts, at the contacts 942, the circuit for operating the rotary magnet O13 of the first office register O1; whereby the first office register O1 is set to register the first office code digit 9. Each time the rotary magnet O13 operates and then restores, it completes and then interrupts, at the contacts O16, a circuit for operating the vertical magnet OC10 of the office composite switch OC so that in the present instance, the wiper carriage of the office composite switch OC is driven 9 steps in the vertical direction away from its normal vertical position. In view of the foregoing, it will be understood that the operation of the mark relay 9M in the outgoing link 600 effects the recapture of the first office code digit 9 that was employed in the operation of the first selector 505 to select the trunk 610 extending to the outgoing link 600. Moreover the operation of the mark relay 9M in the outgoing link 600 effects operation of the register sequence switch RS in the register translator 900 to select the second office register O2 so that when the second office code digit 2 is substantially dialed by the subscriber at the calling subscriber substation T1, the second office code digit 2 is registered in the second office register O2.

Continuing now with the extension of the present call, the subscriber at the calling subscriber substation T1 dials the second office code digit 2, whereby the line relay R620 follows. Each time the line relay R620 restores and then reoperates, it interrupts and then recompletes, at the contacts 621, the circuit for energizing the winding of the hold relay R630 in order to retain the latter relay in its operated position during impulsing, the hold relay R630 being of the slow-to-release type. Also each time the line relay R620 restores and then reoperates, it completes and then interrupts, at the contacts 623, a path for applying ground potential to the conductor 911 in the cable 910, thereby to complete a series circuit for energizing the winding of the series relay R920 and the rotary magnet O24 of the second office register O2; this series circuit, including the wiper RS3 of the register sequence switch RS and the engaged second contact in the associated contact bank. Thus the series relay R920 operates and remains operated during impulsing and the rotary magnet O24 operates and restores twice in order to register the second office code digit 2 in the second office register O2. Upon operating the series relay R920 completes, at the contacts 921, a circuit for energizing the winding of the step relay R925 in series with the rotary magnet RS4 of the register sequence switch RS, whereby the step relay R925 operates; however the rotary magnet RS4 does not operate by virtue of the series resistance of the winding of the step relay R925.

At the conclusion of the dialing of the second office code digit 2 at the calling subscriber substation T1, the line relay R620 is retained in its operated position in order to retain operated the hold relay R630 so as to cause the series relay R920 to restore shortly thereafter. Upon restoring the series relay R920 completes, at the contacts 922, a direct circuit, including the contacts 926, for operating the rotary magnet RS4, whereby the wipers RS3, etc., of the register sequence switch RS are driven to engage the third contacts in the associated contact bank. Specifically the wiper RS3 engages the third contact in the associated contact bank terminating the third conductor in the cable RSC extending to the third office register O3.

In view of the foregoing description of the manner in which the second office code digit 2 dialed at the calling subscriber substation T1 is repeated by the line relay R620 and registered in the second office register O2, it will be understood that in a similar manner, the third office code digit 2, the first numerical digit 1, the second numerical digit 2, the third numerical digit 3 and the fourth numerical digit 4, dialed at the calling subscriber substation T1 are respectively repeated by the line relay R620 and registered in the respective third office register O3, first numerical register N1, second numerical register N2, third numerical register N3 and fourth numerical register N4 in the register translator 900. Recapitulating: the recaptured first office code digit 9 dialed at the calling subscriber substation T1 is registered in the first office code register O1 in the register sender 900 and the second office code digit 2, etc., dialed at the calling subscriber substation T1 are received by the line relay R620 and are repeated thereby and registered directly in the second office register O2, etc., in the register translator 900.

Before proceeding with the sending operation of the register translator 900, it is again noted that the line relay R1150 in the trunk selector repeater 1100 was operated incident to operation of the gang relay R660 in the outgoing link 600, and the consequent connection of the outgoing link 600 to the register translator 900. Upon operating the line relay R1150 completes, at the contacts 1154, a circuit, including the contacts 1187, for operating the hold relay R1155. Upon operating the hold relay R1155 completes, at the contacts 1159, a path, including the contacts 1139, for applying ground potential to the start conductor 533 extending to the detector 520; and completes, at the contacts 1158, a path for applying ground potential via the winding of the detect relay R1140 and the contacts 1138 to the mark conductor 532 extending to the contact bank of the finder 530 individually associated with the detector 520. The application of ground potential to the start conductor 533 initiates operation of the detector 520, whereby the individually associated finder 530 operates to find the calling trunk selector repeater 1100 as evidenced by the application of ground potential to the mark conductor 532. When the finder 530 finds the position of the marking conductor 532 extending to the trunk selector repeater 1100, operation thereof is arrested and a series circuit, including the contacts 531 of the finish relay R530 in the detector 520, the mark conductor 532 and the contacts 1138 and 1158, is completed for operating the detect relay R1140 in the trunk selector repeater 1100.

Upon operating the detect relay R1140 completes, at the contacts 1143, a circuit, including the conductor 1192, for operating the gang relay R710 in the outgoing link 600; whereby the latter relay completes, at its contacts 711, 712, 713, 714, etc., connections between the WXYZ storage relay groups M700, C700, D700 and U700 and the respective WXYZ marking groups M520, C520, D520 and U520, extending to the detector 520. Also the detect relay R1140 completes, at the contacts 1141, a path, including the resistor 1123, for connecting the 70 volts booster battery 1122 to the control conductor 613 of the trunk 610; and interrupts at the contacts 1142, the previously traced normally completed path for applying ground potential to the control conductor 613. The application of the 70 volts booster battery potential from the booster battery 1122 to the control conductor 613 of the trunk 610 effects operation of the detector 520 via the local switch train, including the first selector 505, the finder 504 and the line circuit 501, whereby the detector 520 detects the thousand digit, the hundred digit, the ten digit and the unit digit of the numerical designation or directory number of the calling subscriber line 7930 and marks the respective digit noted to the WXYZ group of marking conductors M520, C520, D520 and U520. Specifically the digits 7, 9, 3 and 0 are marked upon a WXYZ basis upon the respective marking conductors M520, C520, D520 and U520 and respectively stored in the associated WXYZ relay marking groups M700, C700, D700 and U700 in the local access circuit 600.

In accordance with the usual convention, the WXYZ relays in each marking group M700, etc., are operated in accordance with the code:

| | |
|---|---|
| 1 — WX | 6 — YZ |
| 2 — WY | 7 — W |
| 3 — WZ | 8 — X |
| 4 — XY | 9 — Y |
| 5 — XZ | 10 — Z |

The operation of each W, etc., relay in each marking group M700, etc., effects the completion of a holding circuit therefor, including the associated front contacts and the grounded conductor 1194; whereby, at this time, the various WXYZ marking relays in the various groups M700, etc., are operated so that the individual digits 7, 9, 3 and 0 are respectively stored in the relay marking groups M700, C700, D700 and U700, as noted above. When the detector 520 has completed its operation to mark the WXYZ marking conductors M520, etc., as noted above, the finish relay R530 is operated to interrupt, at the contacts 531, the circuit for retaining operated the detect relay R1140 in the trunk selector 1100. Also operation of one of the W, X, Y or Z relays in the group of marking relays U700 completes, at its associated front contacts, a path for applying ground potential to the conductor 1193 in order to effect operation of the register relay R1135 in the trunk selector repeater 1100 shortly thereafter, the register relay R1135 being of the slow-to-operate type.

Upon operating the register relay R1135 interrupts, at the contacts 1139 the path for applying ground potential to the start conductor 533; interrupts, at the contacts 1138, the path for applying ground potential to the mark conductor 532; and prepares, at the contacts 1136 and 1137, multiple paths for applying ground potential to the start conductor 1195 and the mark conductor 1196 respectively extending to the tabulator allotter 740 and to the finder 744 individually associated with the tabulator 742; which markings are employed for a purpose more fully explained hereinafter. Upon restoring the detect relay R1140 interrupts, at the contacts 1143, the circuit for retaining operated the gang relay R710 so as to effect the disconnection of the WXYZ relay marking groups M700, etc., from the WXYZ marking leads M520, etc., extending to the detector 520. At this time, the detector 520 has been employed to detect the numerical designation or directory number of the calling subscriber line 7930 and is released, the finish relay R530 restoring at this time.

Reverting to the register translator 900, as previously explained, the recapturing and registering of the first office code digit 9 in the first office register O1 effects operation of the wiper carriage of the office composite switch OC, nine steps in the vertical direction. Moreover the registration of the second office code digit 2 in the second office register O2 effects the selection by the wiper O21 thereof of the second conductor in the wiper cable W, whereby the second wiper OC2 carried by the wiper carriage of the office composite switch OC is selected and ground potential is applied thereto. Further as the third office code digit 2 was registered in the office register O3, the rotary magnet O34 operated to repeat, at the contacts O36, over a circuit, including the contacts 946, for operating the rotary magnet OC11 of the office composite switch OC so as to effect driving of the wiper carriage two steps in the rotary direction. Accordingly at this time, the wiper carriage of the office composite switch OC occupies its 9-up-2-in position and ground potential is applied to the second wiper OC2 thereof so that ground potential is applied to the associated jumper in the jumper field provided in the associated contact bank thereof that extends to the vertical and rotary control contact banks of the office route switch OR. For example, the 9-up-2-in contact in the contact bank associated with the wiper OC2 of the office composite switch OC may be jumpered to the 1-up-2-in contact, in the contact bank associated with the vertical control wiper OR1 and rotary control wiper OR2 of the office route switch OR for control purposes.

As the office registers O1, O2, etc., is operated away from its home position, the sets of switch springs O15, 026, etc., are operated. Specifically sets of switch springs O15, O26, O36 and N14 are operated when the respective office registers O1, O2 and O3 and the numerical register N1 are operated away from their home positions; the sets of switch springs N24 and N25 are operated when the numerical register N2 is operated away from its home position; the sets of switch springs N34 and N35 are operated when the numerical switch N3 is operated away from its home position; and the set of switch springs N44 is operated when the numerical register N4 is operated away from its home position.

More particularly when the third numerical digit 3 is registered in the third numerical register N3, the set of switch springs N35 is operated to complete a path for applying ground potential to the impulsing wheel 1034, whereby a circuit, including the contacts 977 and 971, is completed for operating the vertical magnet OR9 of the office route switch OR. More particularly the vertical magnet OR9 is operated repeatedly until the vertical control wiper OR1 engages the contact in the associated contact bank having ground potential applied thereto via the associated resistor. In the present example, when the wiper carriage of the office route switch OR is driven one step in the vertical direction, the vertical control wiper OR1 engages the first contact in the associated contact bank that is connected to the resistor that terminates the grounded 1-up-2-in contact in the associated contact bank, thereby completing a circuit for energizing the left-hand winding of the vertical test relay R970 in series with the vertical magnet OR9 effecting operation of the latter relay. Upon operating the vertical test relay R970 completes, at the contacts 973, a holding circuit for energizing the right-hand winding thereof that includes the grounded conductor 1016. Also the vertical test relay R970 interrupts, at the contacts 971, a point in the previously-traced direct circuit for energizing the vertical magnet OR9 from the impulsing wheel 1034; and completes, at the contacts 972, a substantially identically alternative circuit for energizing the rotary magnet OR10 from the impulsing wheel 1034. Thus at this time, operation of the vertical magnet OR9 is arrested and operation of the rotary magnet OR10 is initiated, whereby the rotary magnet OR10 operates repeatedly until the rotary control wiper OR2 engages the grounded contact in the associated contact bank. In the present example, the wiper carriage of the office route switch OR is driven 2 steps in the rotary direction, whereupon the rotary control wiper OR2 engages the grounded contact in the associated contact bank, completing a circuit for energizing the right-hand winding of the rotary test relay R975 in series with the rotary magnet OR10 causing the latter relay to operate. Upon operating the rotary test relay R975 completes, at the contacts 976 a holding circuit for energizing the left-hand winding thereof that includes the grounded conductor 1016; and interrupts, at the contacts 977 the direct circuit for energizing the rotary magnet OR10. Accordingly at this time operation of the wiper carriage of the office route switch OR in the rotary direction is arrested. In passing, it is noted that the rotary test relay R975 is of the marginal type so that the rotary control wiper OR2 must engage direct ground potential to effect operation thereof, thereby preventing operation of the rotary test relay R975 by virtue of the application of ground potential through two of the resistors in the contact bank associated with the rotary control wiper OR2 in series relation. Specifically at this time the wiper carriage of the office route switch OR has been operated into its 1-up-2-in position that corresponds to the 9-up-2-in position of the wiper carriage of the office composite switch OC when the second wiper OC2 of the office composite switch OC is selected and grounded by the wiper O21 of the second office register O2. Recapitulating: the office composite switch OC has been set in a composite manner based upon the setting of the office registers O1, O2 and O3 in accordance with the respective office code digits 9, 2 and 2; and the office route switch OR has been set in accordance with the setting of the office composite switch OC. Specifically at this time the wiper OR4 carried by the wiper carriage of the office switch OR engages the 1-up-2-in contact in the associated contact bank, that, in turn, terminates the fourth marking conductor in the numerical cable N; while each of the other wipers OR5, OR6, OR7 and OR8 carried by the wiper carriage of the office route switch OR engage the 1-up-2-in contacts in the associated contact banks that are commonly strapped to the skip conductor SK. Thus at this time, the office route switch OR has operated to translate the setting of the office composite switch OC to produce a single routing digit 4 that will be subsequently employed in routing the present connection from the RA6 office, as explained more fully hereinafter.

When the third numerical digit 3 is completely registered in the third numerical register N3, the register sequence switch RS is moved into its seventh position, in the manner previously explained, whereby the wiper RS2 thereof engages the grounded seventh contact in the associated contact bank applying ground potential to the conductor 1081 extending to the unpulsing wheel 1035, whereby the impulsing wheel 1035 transmits ground impulses via the contacts 1047 and 1075 to the rotary magnet DS3 of the digit send switch DS. More particularly the rotary magnet DS3 operates and then restores driving the wipers DS1 and DS2 one step in the clockwise direction away from their home or first positions. When the wiper DS1 engages the second contact in the associated contact bank, including in the grounded multiple, a circuit is completed for operating the shunt relay R1060. Upon operating the shunt relay R1060 completes, at the contacts 1061, a multiple path for applying ground potential to the conductor 1016; and completes, at the contacts 1063, a circuit, including the contacts 1072 and the conductor 1082, for operating the rotary magnet SS4 of the send sequence switch SS. Upon operating the rotary magnet SS4 conditions the wipers SS1 to SS3, inclusive, of the send sequence switch SS to be driven in the clockwise direction out of their home positions. Finally the shunt relay R1060 interrupts at the contacts 1062, a normally completed shunt between the impulsing conductors 912 and 913 extending to the windings of the line relay R1150 in the trunk selector repeater 1100. The impulsing wheel 1035 continues to send ground impulses to the rotary magnet DS3 of the digit send switch DS, as noted, causing rotary stepping of the wipers DS1 and DS2. Each time the rotary magnet DS3 operates and then restores, the wipers DS1 and DS2 are driven an additional step in the clockwise direction and the connection between the impulsing conductors 912 and 913 is interrupted and recompleted, at the contacts DS5, whereby impulses are transmitted over the impulsing conductors 912 and 913 to the line relay R1150. In the present example, after the rotary magnet DS3 has operated and then restored in order to transmit four impulses at the contacts DS5 over the impulse conductors 912 and 913, the wiper DS2 of the digit send switch DS engages the sixth contact in the associated contact bank terminating the fourth conductor in the numerical cable N, that is, in turn, terminated by the contact in the contact bank engaged by the wiper OR4 of the office route switch OR, which wiper OR4 is, in turn, terminated by the first contact at the contact bank engaged by the grounded wiper SS3 of the send sequence switch SS at this time. Accordingly ground potential appearing upon the fourth conductor in the numerical cable N is applied to the wiper DS2 of the digit send switch DS and thus to the stop conductor SP effecting operation of the stop send relay R1070.

Upon operating the stop-send relay R1070 completes, at the contacts 1071, an alternative shunt between the impulsing conductors 912 and 913 in order to render further operation of the rotary magnet DS3 ineffective to transmit impulses over the impulsing conductors 912 and 913. Thus in the present example, the rotary magnet DS3 operated to transmit, at the contacts DS5, a series of four impulses comprising the routing digit 4 registered in the office route switch OR over the impulsing conductors 912 and 913 to the trunk selector repeater 1100; at which time, the stop-send relay R1070 was operated as noted above. Also upon operating the stop-send relay R1070 interrupts, at the contacts 1072, the previously traced circuit for operating the rotary magnet SS4 of the send sequence switch SS in order to cause the latter magnet to restore, so as to drive the wipers SS1 to SS3, inclusive, one step in the clockwise direction out of their home or first positions into their second positions for a purpose more fully explained hereinafter. Further the stop-send relay R1070 completes, at the contacts 1073, a holding circuit, including the contact 1063, for energizing the winding thereof; interrupting, at the contacts 1075, the original impulsing circuit for the rotary magnet DS3 of the digit send switch DS; and completes, at the contacts 1074, an alternative circuit, including the contacts DS4, the wiper DS1 and the engaged grounded contact in the associated contact bank for operating the rotary magnet DS3. The completion of the above traced circuit causes the rotary magnet DS3 to operate "buzzer" fashion, whereby the wipers DS1 and DS2 of the digit send switch DS are automatically driven back into their home positions, whereby the wiper DS1 disengages the last contact in the associated contact bank, interrupting the alternative circuit for operating the rotary magnet DS3 and the multiple circuit for retaining operated the shunt relay R1060 causing the latter relay to restore shortly thereafter, it being of the slow-to-release type. At this time, the digit send switch DS has been returned back into its home position following the sending of the routing digit 4 and shortly thereafter the shunt relay R1060 restores as noted above, recompleting, at the contacts 1062, the shunt between the impulsing conductors 912 and 913; and interrupting, at the contacts 1063, the holding circuit for retaining operated the stop-send relay R1070 so as to cause the latter relay to restore shortly thereafter, it being of the slow-to-release type. Upon restoring the stop-send relay R1070 interrupts, at the contacts 1071, the additional shunt between the impulse conductors 912 and 913; and recompletes, at the contacts 1075, the original impulsing circuit via the impulsing wheel 1035 for the rotary magnet DS3 of the digit send switch DS.

The line relay R1150 in the trunk selector repeater 1100 follows the impulses of the routing digit 4. Each time the line relay R1150 restores and then reoperates, it interrupts and then recompletes, at the contacts 1154, the circuit for energizing the winding of the hold relay R1155, whereby the latter relay is retained in its operated position during impulsing, as it is of the slow-to-release type. Also each time the line relay R1150 restores and then reoperates, it completes and then interrupts, at the contacts 1155, a circuit, including the contacts 1156, for energizing the winding of the series relay R1170 in series with the vertical magnet M1114, whereby the series relay R1170 operates and remains operated during impulsing, as it is of the slow-to-release type, and the vertical magnet M1114 operates and restores driving the wiper carriage of the Strowger mechanism 1110 one step in the vertical direction away from its normal vertical position. When the wiper carriage of the Strowger mechanism 1110 is driven one step in the vertical direction away from its normal vertical position, the sets of switch springs S1118, S1119 and S1120 are operated. Operation of the set of switch springs S1118 completes a circuit, including the contacts 1116 and 1171 and the grounded hold conductor 663 of the trunk 610 for operating the step relay R1175. Upon operating the step relay R1175 completes, at the contacts 1176, a multiple holding circuit, including the set of switch springs S1118 and the contacts 1116, for energizing the winding thereof. In the present example, the line relay R1150 restores and then reoperates four times in accordance with the routing digit 4, whereby the wiper carriage of the Strowger mechanism 1110 is driven in the vertical direction four steps to select the group of trunks, including the trunks 214, etc., extending to the trunk circuits 212, etc., terminating the trunk lines 211, etc., extending to the WA2 office.

At the conclusion of the routing digit 4, the line relay R1150 is retained in its operated position so as to effect the restoration of the series relay R1170 shortly thereafter, the latter relay being of the slow-to-release type. Upon restoring the series relay R1170 completes, at the contacts 1172, a circuit, including the contacts 1177, and the grounded conductor 663 for operating the rotary magnet M1115, whereby the wiper carriage of the Strowger mechanism 1110 is driven one step in the rotary direction away from its normal rotary position causing the wipers 1111, etc., to select the first trunk in the previously selected group. Also upon operating the rotary magnet M1115 interrupts, at the contacts 1116, the holding circuit for retaining operated the step relay R1175; whereby the latter relay upon restoring interrupts, at the contacts 1177, the circuit for operating the rotary magnet M1115. Upon restoring the rotary magnet M1115 completes, at the contacts 1116, a test connection between the winding of the step relay R1175 and the control wiper 1113 carried by the wiper carriage of the Strowger mechanism 1110, which circuit also includes the set of switch springs S1118 and the contacts 1185. The subsequent operation of the trunk selector repeater 1100 depends upon the idle or busy condition of the selected first trunk in the previously noted group, ground potential appearing upon the control conductor of the trunk noted in the event it is busy and battery potential appearing upon the control conductor of the trunk noted in the event it is idle.

First assuming that the trunk noted is busy, ground potential appearing upon the control conductor thereof is applied to the control wiper 1113 completing the previously traced test circuit for operating the step relay R1175, whereby the latter relay recompletes, at the contacts 1177, the circuit for reoperating the rotary magnet M1115 so that the wiper carriage of the Strowger mechanism is driven an additional step in the rotary direction. Also the rotary magnet M1115 effects the restoration of the step relay R1175, whereby the latter relay effects the restoration of the rotary magnet M1115 so that the rotary magnet M1115 recompletes, at the contacts 1116, the previously traced test circuit extending between the test wiper 1113 and the winding of the step relay R1175 in order that the presently selected trunk may be tested. Assuming that the trunk line 211 is the first idle trunk line in the group extending to the WA2 office, the step relay R1175 and the rotary magnet M1115 continue to interact in the manner described above until the wiper carriage of the Strowger mechanism 1110 selects the trunk 214 extending to the trunk circuit 212 terminating the trunk line 211, whereupon the presence of battery potential upon the control conductor of the trunk 214 effects short-circuiting of the winding of the step relay R1175 preventing further operation thereof. At this time, a series circuit, including the grounded conductor 663 of the trunk 610, the set of switch springs S1118 and the contacts 1116, is completed for energizing the winding of the switch relay R1180 in series with the winding of the step relay R1175, whereby the switch relay R1180 is operated. However the step relay R1175 is not operated as it is of the marginal type. Upon operating the switch relay R1180 interrupts, at the contacts 1185, the test circuit between the control wiper 1113 and the winding of the step relay R1175; and completes, at the contacts 1186, a direct path for connecting the grounded control conductor 663 of the trunk 610 to the control wiper 1113 in order to effect seizure of the trunk 214 and the consequent marking of the trunk 214 as busy to the other trunk selector repeaters having access thereto. Further the switch relay R1180 completes, at the contacts 1181 and 1182 a loop circuit for energizing the upper winding of the answer relay R1160 via the line wipers 1111 and 1112; and completes, at the contacts 1183, a circuit for energizing the lower winding of the answer relay R1160. However the answer relay R1160 is not operated at this time since it is of the polarized type. Further the switch relay R1180 prepares, at the contacts 1184, a circuit for operating the dial relay R1165; and prepares, at the contacts 1188, a circuit traced hereinafter for operating the pickup relay R1190. The loop circuit extending between the upper winding of the answer relay R1160 and the line conductors of the trunk 214 also includes the contacts 1151 of the line relay R1150 and the windings 1133 and 1134 of the repeater 1130 so that the line relay R1150 may repeat the digits subsequently received by the trunk selector repeater 1100 over the trunk 214 and consequently over the trunk line 211 extending to the WA2 office. Finally the switch relay R1180 interrupts, at the contacts 1187, the circuit for retaining operated the hold relay R1155, whereby the latter relay restores shortly thereafter, it being of the slow-to-release type. Upon restoring the hold relay R1155 prepares, at the contacts 1157, a circuit traced hereinafter for operating the tabulator relay R1145 and the release magnet M1117. At this time, the trunk selector repeater 1100 has operated as a selector in response to the routing digit 4 and now occupies its repeater position. Also when the trunk circuit 212 is thus seized, it operates to effect the return of ground potential over the control conductor of the trunk 214 and consequently to the control wiper 1113 carried by the wiper set of the Strowger mechanism 1110. Further the trunk circuit 212 governs the trunk circuit terminating the trunk line 211 in the WA2 office in order to bring about the connection thereto of a register translator therein.

Again reverting to the register translator 900, when the wiper SS3 of the send sequence switch SS engages the second contact in the associated contact bank, ground potential is applied to the wiper OR5 in the office route switch OR and consequently to the skip conductor SK completing a circuit, including the contacts SS5 for operating the rotary magnet SS4 of the send sequence switch SS. The rotary magnet SS4 operates to condition the wipers SS1, etc., of the send sequence switch SS to be driven an additional step in the clockwise direction; and interrupts, at the contacts SS5, the circuit for operating the rotary magnet SS4. Thus the rotary magnet SS4 restores driving the wipers SS1, etc., to engage the third contacts in the associated contact banks. In the present example, each of the wipers OR5, OR6, OR7 and OR8 in the office route switch OR is strapped to the skip conductor SK, whereby the rotary magnet SS4 is operated "buzzer" fashion in order to drive the wipers SS1, etc., to engage the sixth contacts in the associated contact banks. More particularly the wiper SS3 commonly engages the sixth contacts in the associated contact bank respectively terminating the conductor 915 and the first conductor in the sending cable SSC that is connected to the wiper O12 of the first office register O1, that, in turn, engages the ninth contact in the associated contact bank terminating the ninth conductor in the numerical cable N since the first office code digit 9 is registered in the first office register O1 in the present example.

The application of ground potential to the conductor 915 completes a circuit, including the contacts of the gang relay R660, the conductor 665 and the contacts 1192 and 1188, for operating the pickup relay R1190 in the trunk selector repeater 1100. Upon operating the pickup relay R1190 completes, at the contacts 1191, a holding circuit for energizing the winding thereof, that also includes the grounded conductor 663 and the contacts 1188. Also the pickup relay interrupts, at the contacts 1192, the original operating circuit therefor; and prepares, at the contacts 1193, a path traced hereinafter for repeating over the pulse conductor 1197 the code digits and the numerical digits subsequently received by the line relay R1150 of the trunk selector repeater 1100.

Returning now to the register translator 900, incident to restoration of the stop-send relay R1070, the impulsing wheel 1035 again effects repeated operation of the rotary magnet DS3 of the digit send switch DS, whereby the rotary magnet DS3 effects sending, at the contacts DS5 of the first office code digit 9, over the impulsing conductors 912 and 913 to the line relay R1150 in the trunk selector repeater 1100. At the conclusion of the sending of the first office code digit 9 and when the wiper DS2 of the digit send switch DS engages in the eleventh contact in the associated contact bank terminating the ninth conductor in the numerical cable N, the previously traced circuit for reoperating the stop-send relay R1070 is completed so as to terminate the sending of the first office code digit 9 and to effect recycling of the register translator 900, in the manner previously explained.

The line relay R1150 in the trunk selector repeater 1100 follows the first office code digit 9. Each time the line relay R1150 restores and then reoperates, it completes and then interrupts, at the contacts 1152, the previously mentioned circuit, including the contacts 1184 for energizing the winding of the dial relay R1165, whereby the latter relay operates and remains operated during impulsing since it is of the slow-to-release type. Upon operating the dial relay R1165 completes, at the contacts 1166, a path for short-circuiting the upper winding of the answer relay R1160 and the winding 1133 of the repeater 1130 in order to improve the impulsing circuit from the contacts 1151 over the line conductors of the trunk 214 extending to the trunk circuit 212. Also each time the line relay R1150 restores and then reoperates it completes and then interrupts, at the contacts 1151, the impulsing bridge extending via the line conductors of the trunk 214 to the trunk circuit 212 and thence via the line conductors of the trunk 211 into the register translator disposed in the WA2 office, whereby the first office code digit 9 is repeated by the line relay R1150 in the trunk selector repeater 1100 to the register translator in the WA2 office and registered therein. Further each time the line relay R1150 restores and then reoperates, it completes and then interrupts, at the contacts 1152, a multiple path, including the contacts 1193 for repeating the first office code digit 9 over the pulse conductor 1197 to the winding of the series relay R820 and via the wiper RSS1 and the engaged first contact in the associated contact bank and the first conductor in the associated cable extending to the rotary magnet R13 of the register R1 in the outgoing link 600. Thus the series relay R820 is operated and remains operated during impulsing as it is of the slow-to-release type, and the first office code digit 9 is registered in the register R1 in the outgoing link 600. Upon operating the series relay R820 completes, at the contacts 822, a circuit for energizing the winding of the step relay R810 in series with the rotary magnet RSS2 of the register sequence switch RS, whereby the step relay R810 operates. However the rotary magnet RSS2 does not operate as a consequence of the series resistance of the winding of the step relay R810.

At the conclusion of the first office code digit 9, the line relay R1150 in the trunk selector repeater 1100 is retained in its operated position, whereby the dial relay R1165 restores shortly thereafter, it being of the slow-to-release type. Upon restoring the dial relay R1165 again inserts the upper winding of the answer relay R1160 and the winding 1133 of the repeater 1130 in series relation with the loop circuit extending via the line conductors of the trunk 214 to the register translator in the WA2 office; however without effect at this time. Also the line relay R1150 interrupts, at the contacts 1152, the path for applying ground potential to the impulse conductor 1197, whereby the series relay R820 restores shortly thereafter, it being of the slow-to-release type. Upon restoring the series relay R820 completes, at the contacts 821, a circuit, including the contacts 811, for operating the rotary magnet RSS2; and interrupts, at the contacts 822, the circuit for retaining operated the step relay R810 causing the latter relay to restore shortly thereafter, it being of the slow-to-release type. Upon restoring the step relay R810 interrupts, at the contacts 811, the circuit for operating the rotary magnet RSS2, whereby the latter magnet restores driving the wiper RS1 of the register sequence switch RSS to engage the second contact in the associated contact bank terminating the second conductor in the associated cable extending to the rotary magnet R23 of the second register R2 in the outgoing link 600.

In view of the foregoing, it will be understood that when the register translator 900 sends the first office code digit 9 to the line relay R1150 in the trunk selector 1100, that the line relay R1150 repeats the first office code digit 9 over the trunk 214 causing it to be registered in the register translator in the WA2 office; and also the line relay R1150 repeats the first office code digit 9 over the pulse conductor 1197 causing it to be registered in the first register R1 in the outgoing link 600. Specifically the wipers R11 and R12 of the first register switch R1 are set in accordance with the first office code digit 9 to mark in the Y conductor in the group of WXYZ marking conductors C10.

In view of the foregoing explanation of the mode of operation of the register translator 900 to send the first office code digit 9 registered in the first office register O1, it will be understood that the register translator 900 operates in a substantially identical manner to transmit the second and third office code digits 2 and 3 respectively registered in the office registers O2 and O3 and then the numerical digits 1, 2, 3 and 4 respectively registered in the numerical registers N1, N2, N3 and N4. Moreover the line relay R1150 in the trunk selector repeater 1100 repeats the office code digits and the numerical digits above noted both over the trunk line 214 to the register translator in the WA2 office and over the pulse conductor 1197 to the registers R2 to R7, inclusive, in the outgoing link 600. Accordingly at the conclusion of the operation of the register translator 900, the three office code digits 9, 2 and 2 and the four numerical digits 1, 2, 3 and 4 have been repeated by the line relay R1150 in the trunk selector repeater 1100 both over the trunk 211 and the pulse conductor 1197, whereby the digits noted have been registered both in the register translator in the WA2 office and in the registers R1 to R7, inclusive, in the outgoing link 600.

Following the transmission of the fourth numerical digit 4 from the register translator 900, the send sequence switch SS is operated into its thirteenth position so that the grounded wiper SS3 thereof engages the contact terminating the conductor 1084, whereby a circuit, including the contacts 1041, the conductor 911, the contacts of the gang relay R660 and the contacts 622, is completed for operating the switch relay R640 in the outgoing link 600. Upon operating the switch relay R640 completes, at the contacts 645, a holding circuit, including the grounded conductor 613 of the trunk 610, for energizing the winding thereof. Also the switch relay R640 interrupts, at the contacts 641 and 643, the loop circuit extending between the calling subscriber substation T1 and the line relay R620; and completes, at the contacts 642 and 644, an alternative loop circuit between the calling subscriber substation T1 and the line relay R1150 in the trunk selector repeater 1100. Also the switch relay R640 interrupts, at the contacts 646, the holding circuit for retaining operated the mark relay 9M; and interrupts, at the contacts 647, the circuit for energizing the winding of the cut-through relay R650 in series with the rotary magnet M673 of the finder 670 so as to cause the cut-through relay R650 to restore. Finally the switch relay R640 interrupts, at the contacts 648, the normal test connection between the rotary magnet M673 and the wiper 671 of the finder 670 so as to prevent operation of the rotary magnet M673 at this time. Upon restoring the cut-through relay R650 interrupts, at the contacts 653, the circuit for retaining operated the gang relay R660 so as to cause the latter relay to interrupt, at its contacts, the connections between the outgoing link 600 and the register translator 900. Also the line relay R620 restores effecting the restoration of the hold relay R630 shortly thereafter, the latter relay being of the slow-to-release type. Upon restoring the hold relay R630 interrupts, at the contacts 631, the initial path for applying ground potential to the control conductor 613 of the trunk 610; however ground potential at this time is retained upon the control conductor 613 since ground potential is applied to the control wiper 1113 carried by the wiper carriage of the Strowger mechanism 1110 in the trunk circuit 212 terminating the trunk 211 extending to the WA2 office.

When the gang relay R660 in the outgoing link 600 restores, the circuits for retaining operated the seize relay R1050 and the set relay R935, the transfer relay R940, the vertical test relay R970 and the rotary test relay R975 in the register translator 900 are interrupted causing the relays mentioned to restore. Upon restoring the seize relay R1050 completes, at the contacts 1052, a path for applying ground potential to the release conductor R, thereby completing parallel circuits for operating the release magnet RS5 of the register sequence switch RS, the release magnet O14 of the office register O1, the release magnet O25 of the office register O2, the release magnet O35 of the office register O3, the release magnet N13 of the numerical register N1, the release magnet N23 of the numerical register N2, the release magnet N33 of the numerical register N3, the release magnet N43 of the numerical register N4, the release magnet OC12 of the office composite switch OC, and the release magnet OR11 of the office route switch OR, whereby the release magnets noted are operated effecting the release of the corresponding switches. When the register sequence switch RS is thus released, the sets of switch springs RS7 and RS6 are respectively opened and closed. Opening of the set of switch springs RS7 effects the restoration of the release magnet RS5; and closure of the set of switch springs RS6 forwards ground potential upon the release conductor R to the multiple in the contact bank associated with the wiper SS2 of the send sequence switch SS in order to effect operation of the rotary magnet SS4 "buzzer" fashion until the wipers SS1, etc., of the send sequence switch SS are returned back into their home positions. As the office registers OR1, OR2, and OR3 are thus released, the sets of switch springs O15, O26 and O36 are opened to restore the release magnets O14, O25 and O35. As the numerical registers N1, N2, N3, and N4 are thus released, the sets of switch springs N14, N24, N34 and N44 are opened to restore the release magnets N13, N23, N33 and N43. When the wiper carriage of the office composite switch OC is thus released and returned back into its normal rotary and vertical positions, the set of switch springs OC13 is opened to restore the release magnet OC12; and when the wiper carriage of the office route switch OR is thus released and returned back into its normal rotary and vertical positions, the set of switch springs OR12 is opened to restore the release magnet OR11. At this time, the register translator 900 is completely released and available for further use by the application of battery potential via the winding of the seize relay R1050, the conductor 1016 and the contacts 1011' to the control conductor 1015, whereby the register translator 900 may be selected by one of the finders associated with an idle one of the outgoing links.

When the office code digits 9, 2 and 2 and the numerical digits 1, 2, 3 and 4 are registered in the register sender in the WA2 office, the register sender mentioned is operated in order to control the associated switch train so as to extend the connection to the called subscriber line 1234 in the WA2 office, whereby the associated switch train operates to test the idle or busy condition of the called subscriber line 1234 in a conventional manner. First assuming that the called subscriber line 1234 in the WA2 office is busy at this time the local switch train therein operates to return a busy-tone signal over the loop circuit back to the windings 1133 and 1134 of the repeater 1130 in the trunk selector repeater 1100, whereby the busy-tone signal is repeated to the windings 1131 and 1132 of the repeater 1130 and thus over the trunk 610 to the calling subscriber substation T1 in the RA6 office.

The subscriber at the calling subscriber substation T1 in the RA6 office then disconnects interrupting the loop circuit extending to the line relay R1150 in the trunk selector repeater 1100, whereby the latter relay restores interrupting, at the contacts 1151, the loop circuit extending to the switching apparatus in the WA2 office, whereby the last-mentioned switching apparatus is released controlling the trunk circuit 212 over the trunk line 211 so that ground potential is removed from the control wiper 1113 of the wiper set carried by the Strowger mechanism 1110 effecting the immediate restoration of the switch relay R1180 in the trunk selector repeater 1100, without effecting the immediate restoration of the switch relay R640 in the outgoing link 600, since the latter relay is of the slow-to-release type. Upon restoring the switch relay R1180 interrupts, at the contacts 1188, the circuit for retaining operated the pickup relay R1190; completes, at the contacts 1187, a circuit, including the contacts 1155 and 1157 and the set of switch springs S1119, for operating the release magnet M1117; and completes, at the contacts 1187, a multiple circuit, including the contacts 1155 and 1157, the set of switch springs S1120, the contacts 1149', the conductor 666 and the contacts 646', for operating the tabulator relay R1145 via the upper winding thereof. Upon operating the tabulator relay R1145 interrupts, at the contacts 1149', a point in its operating circuit; and completes, at the contacts 1149 and 1147, a holding circuit, including the grounded conductor 1194, for energizing the upper winding thereof; and completes, at the contacts 1146, a connection between the grounded conductor 1194 and the control conductor 613 of the trunk 610 so as to retain operated the switch relay R640 and to retain the trunk 610 marked as busy to the selectors 505, etc., having access thereto at this time. Upon operating the release magnet M1117 releases the wiper carriage of the Strowger mechanism 1110, whereby it is returned to its normal rotary and vetrical positions, opening the sets of switch springs S1118, S1119 and S1120. Operation of the set of switch springs S1119 effects the restoration of the release magnet M1117. Further the tabulator relay R1145 completes, at the contacts 1148, multiple connections from the grounded conductor 1194 to the conductors 1195 and 1196 via the contacts 1136 and 1137, respectively. The application of ground potential to the conductor 1195 effects operation of the tabulator allotter 740, whereby operation of the associated finder 741 is initiated to find an idle one of the tabulators 742, etc. Assuming that the finder 741 finds the tabulator 742 as idle at this time operation of the finder 741 is arrested and operation of the finder 744 is initiated. More particularly the finder 744, individual to the tabulator 742 operates to find the grounded mark conductor 1196, whereby operation of the finder 744 is arrested and the start relay R750 in the tabulator 742 is operated. Upon operating the start relay R750 completes, at the contacts 751, a circuit, including the wiper 746 of the finder 744 and the engaged contact in the associated contact bank, for operating the gang relay R730 in the outgoing link 600. Upon operating the gang relay R730 completes, at its contacts 732, etc., connections between the marking groups N1I, etc., and the corresponding storage groups in the tabulator 742; completes, at the contacts 733, etc., connections between the marking groups UT and DT and the corresponding storage groups in the tabulator 742; and completes, at the contacts 734, etc., connections between the marking groups C10, etc., and the corresponding storage groups in the tabulator 742. Specifically the digits 7, 9, 3 and 0 comprising the numerical designation or directory number of the calling subscriber line 7930 are registered in the relay groups M700, C700, D700 and U700 in the outgoing link 600 and are transferred via the marking groups N1I, N2I, N3I and N4I to the respective storage groups in the tabulator 742. Similarly the unit digit and the ten digits of the time duration of the established connecion, in the event the connection was established, is registered in the timer 780 and are transferred via the marking groups UT and DT to the corresponding storage groups in the tabulator 742; in the present example no digits are registered in the timer 780 since the present call was not answered at the called subscriber substation in the WA2 office. Finally the office code digits 9, 2 and 2 of the called office WA2 and the numerical digits 1, 2, 3 and 4 of the called subscriber line in the WA2 office are registered in the registers R1 to R7, inclusive in the outgoing link 600 and are transferred via the marking groups C10, C20, C30, N10, N20, N30 and N40 to the corresponding storage registers in the tabulator 742. Accordingly at this time, all of the items of record information stored in the outgoing link 600 have been transferred and stored in the tabulator 742, whereby the finish relay R755 in the tabulator 742 is operated. Upon operating the finish relay R755 completes, at the contacts 756, a circuit, including the contacts 731, for operating the release relay R720 in the outgoing link 600. Upon operating the release relay R720 interrupts, at the contacts 721, the path for applying ground potential to the hold conductor 1194 in order to effect the restoration of the relay groups M700, C700, D700 and U700. Also the removal of ground potential from the hold conductor 1194 effects the restoration of the tabulator relay R1145 in the trunk selector repeater 1100, whereby ground potential is removed from the control conductor 613 of the trunk 610 so that the latter trunk is again marked as idle to the selectors 505, etc., having access thereto, and effecting the restoration of the switch relay R640 shortly thereafter, since the latter relay is of the slow-to-release type. When the storage group U700 is thus released, ground potential is removed from the conductor 1193 effecting the restoration of the register relay R1135, whereby the latter relay completes, at the contacts 1135', a path for applying ground potential to the release conductor 812 so as to effect operation of the release magnets RSS3, R14, R24, R34, R44, R54, R64 and R74 of the respective register sequence switch RSS, and the register switches R1 to R7, inclusive. Operation of the release magnets noted effect the release of the corresponding switches, whereby the sets of switch springs RSS4, R15, R25, R35, R45, R55, R65 and R75 are opened to effect the restoration of the corresponding release magnets RSS3, R14, etc.

Also the finish relay R755 interrupts, at the contacts 757, the circuit for retaining operated the start relay R750, whereby the latter relay restores effecting the restoration of the gang relay R730. Upon restoring the gang relay R730 interrupts, at the contacts 731, the circuit for retaining operated the release relay R720; and interrupts, at the contacts 732, etc., the connections for transferring the items of record information from the outgoing link 600 to the tabulator 742. At this time the outgoing link 600 and the connected trunk selector repeater 1100 are completely released and available for furher action.

Also upon operating the finish relay R755 in the tabulator 742 completes, at the contacts 758 and 758', paths for applying ground potential to the start conductor 759 and to the mark conductor 759' extending to the perforator 760, whereby operation of the finder 761 individual to the perforator 760 is initiated to find the mark conductor 759' extending to the tabulator 742. When the finder 761 finds the mark conductor 759' extending to the tabulator 742, operation thereof is arrested and the start relay R765 in the perforator 760 is operated. Upon operating the start relay R765 completes, at the contacts 766, a circuit, including the wiper 763 of the finder 761 and the engaged contact in the associated contact bank for operating the gang relay R770, whereby the latter relay completes, at the contacts 771, etc., connections between the tabulator 742 and the perforator 760 so that the tabulator 742 may control the perforator 760 to effect perforation of an associated tape in order to make a permanent record of the items of record information in conjunction with the present call. Subsequently after all of the items of record information stored in the tabulator 742 have been perforated by the perforator 760 the perforator 760 and the tabulator 742 are released. The start relay R765 in the perforator 760 restores to effect the restoration of the gang relay R770 so that the connections between the tabulator 742 and the perforator 760 are interrupted. At this time the tabulator 742 is marked as idle to the tabulator allotter 740, whereby the tabulator 742 may be employed in conjunction with other outgoing links and the perforator 760 may be employed in conjunction with other tabulators.

Now assuming that the called subscribed line 1234 in the WA2 office is idle when it is tested by the associated local switch train, the local switch train operates to project ringing current thereover and to return ring-back current over the loop circuit, including the windings 1133 and 1134 of the repeater 1130, whereby the ring-back tone current is repeated over the windings 1131 and 1132 of the repeater 1130 and over the loop circuit to the calling subscriber substation T1 so as to indicate to the subscriber at the calling subscriber substation T1 that the subscriber substation connected to the called subscriber line 1234 in the called WA2 office is being rung. Subsequently when the subscriber at the called subscriber substation answers the call, the connector in the switch train in the WA2 office operates to reverse the polarity of the loop circuit extending back to the upper winding of the answer relay R1160 in the trunk selector repeater 1100 in order to pole the latter relay to operate. Upon operating the answer relay R1160 completes, at the contacts 1161, a path for applying ground potential to the conductor 1191 extending to the timer 780 so as to effect operation of the start relay R781 therein. Upon operating the start relay R781 completes, at the contacts 782, a circuit for operating the hold relay R783 in the timer 780; and upon operating the hold relay R783 completes, at the contacts 784, a holding circuit for energizing the winding thereof that includes the grounded hold conductor 1194. Also upon operating the start relay R781 effects operation of the timer mechanism in the timer 780, whereby the unit digit and the ten digit of the subsequent time duration of the established connection is registered therein and marked to the unit digit and ten digit groups UT and DT.

At the conclusion of the established connection, when the subscriber at the called subscriber substation in the WA2 office disconnects, the local switch train therein is controlled to restore the polarity of the loop circuit extending back to the upper winding of the answer relay R1160 in the trunk selector repeater 1100 so that the latter relay restores. Upon restoring the answer relay R1160 interrupts, at the contacts 1161 the path for applying ground potential to the start conductor 1191 so as to effect the restoration of the start relay R781 in the timer 780 in order to arrest the registration of additional time in the timer 780. Subsequently when the subscriber at the calling subscriber substation T1 disconnects the line relay R1150 in the trunk selector repeater 1100 is restored effecting the complete release of the trunk selector repeater 1100 and the outgoing link 600 after all of the items of record information have been transferred from the outgoing link 600 to the tabulator 742, in the manner previously explained. In this example, when the release relay R720 in the outgoing link 600 operates to interrupt the application of ground potential to the hold conductor 1194 the hold relay R783 in the timer 780 is restored effecting the complete release of the timer 780. In this example, the transfer of items of record information from the outgoing link 600 to the tabulator 742 is the same as that previously explained except that the digits representing the unit minutes and the ten minutes of the time duration of the established connection are registered in the timer 780 and transferred to the tabulator 742, whereby the tabulator 742 in controlling the perforator 760 brings about the perforation of the time digits noted upon the tape associated with the perforator 760. The perforations that are produced in the tape in the present example indicate that the connection was established between the calling subscriber substation T1 in the RA2 office and the called subscriber substation in the WA2 office, since there is a record item indicating the time duration of this established connection. At this time, the outgoing link 600 and the connected trunk selector repeater 1100 are completely released; and the tabulator 742 and the perforator 760 are released upon completing their operations in the manner previously explained.

Reconsidering the operation of the register translator 900, should an all-trunks busy be encountered by the trunk selector repeater 1100 in the first choice route between the RA6 office and the WA2 office in response to the routing digit 4, the wiper carriage of the Strowger mechanism 1110 in the trunk selector repeater 1100 is driven eleven steps in the rotary direction away from its normal rotary position operating the sets of switch springs S1105 and S1106. When the set of switch springs S1106 is thus operated, ground potential is applied to the conductor 664 and thence via the contacts of the operated gang relay R660 to the busy conductor 914 extending to the register translator 900 so as to complete a circuit, including the contacts 1021, for energizing the lower winding of the busy relay R1040, whereby the latter relay operates. Upon operating the busy relay R1040 completes, at the contacts 1044, a holding circuit, including the conductor 1083 and the set of switch springs SS6 for energizing the upper winding thereof; and interrupts, at the contacts 1042, the loop circuit extending between the register translator 900 and the windings of the line relay R1150 in the trunk selector repeater 1100 via the impulsing conductors 912 and 913 so as to effect the restoration of the line relay R1150 and the consequent restoration of the hold relay R1155 shortly thereafter, the latter relay being of the slow-to-release type. Operation of the set of switch springs S1105 is really without effect in the present example since the trunk selector repeater 1100 is to be immediately released. Upon restoring the hold relay R1155 completes, at the contacts 1157, the previously traced circuit for operating the release magnet M1117, whereby the wiper carriage of the Strowger mechanism 1110 is released and returned back into its normal rotary and vertical positions so that the sets of switch springs S1118, S1119, S1120, S1105 and S1106 are opened.

Also upon operating the busy relay R1040 in the register translator 900 interrupts, at the contacts 1047, the connection between the impulsing wheel 1035 and the rotary magnet DS3 of the digit set switch DS so as positively to prevent further operation of the digit send switch DS, at this time. Also the busy relay R1040 completes, at the contacts 1045, a circuit, including the contacts 1033, for energizing the lower winding of the count relay R1030, whereby the latter relay operates through its first step, it being of the two-step type. When the count relay R1030 operates through its first step, it completes, at the contacts 1031, a path, including the grounded conductor 1015 and the contacts 1033 and 1045, for short-circuiting the upper winding thereof. Further the busy relay R1040 interrupts, at the contacts 1041, the normal connection between the conductor 1084 and the conductor 911 extending to the outgoing link 600 so as to prevent operation of the switch relay R640 at this time. Further the busy relay R1040 completes, at the contacts 1043, a direct circuit for operating the rotary magnet OR10 of the office route switch OR, whereby the wiper carriage thereof is driven an additional step in the rotary direction. Finally the busy relay R1040 completes, at the contacts 1046, a path for applying ground potential to the skip conductor SK, whereby a direct circuit, including the contacts SS5, is completed for operating the rotary magnet SS4 of the send sequence switch SS. Accordingly the wipers SS1, etc., of the send switch SS are operated "buzzer" fashion in the clockwise direction back into their home positions so that the set of switch springs SS6 is opened interrupting the holding circuit for energizing the upper winding of the busy relay R1040, whereby the latter relay restores to interrupt, at the contacts 1046, the path for applying ground potential to the skip conductor SK. Also upon restoring the busy relay R1040 interrupts, at the contacts 1043, the circuit for operating the rotary magnet OR10, whereby the latter magnet restores. Further the busy relay R1040 completes, at the contacts 1042, the bridge between the impulsing conductors 912 and 913 in order to effect reseizure of the trunk selector repeater 1100 so that the line relay R1150 and the hold relay R1155 are reoperated. Further the busy relay R1040 recompletes, at the contacts 1041, the normal connection between the conductors 1084 and 911; recompletes, at the contacts 1047, the connection between the impulsing wheel 1035 and the rotary magnet DS3 of the digit send switch DS; and interrupts, at the contacts 1045, the original circuit for energizing the lower winding of the count relay R1030. At this time, the upper and lower windings of the count relay R1030 are energized in series circuit relation causing the latter relay to operate through its second step. Upon operating through its second step, the count relay R1030 opens, at the contacts 1033, a further point in the original circuit for energizing the lower winding thereof; and prepares, at the contacts 1032, a circuit for energizing the lower winding of the count relay R1020.

At this time, the register translator 900 is in readiness again to send the routing digit from the office route switch OR; and since the wiper carriage of the office route switch OR has been driven an additional step in the rotary direction, a different translation of the office code digits 9, 2 and 2 has been produced. Specifically in the present example, the office route switch OR has produced a translation comprising the digit 8 since the group of trunk lines 231, etc. comprise a second choice route between the RA6 office and the WA2 office via the SP9 office. Accordingly at this time, the digit send switch DS operates to send the routing digit 8, whereby the trunk selector repeater 1100 operates to select the group of trunks 234, etc., and then an idle trunk therein, whereby the present call is routed from the RA6 office to the SP9 office. For example, the trunk selector repeater 1100 may select the trunk 234 extending to the trunk circuit 232 terminating the trunk line 231 extending to the SP9 office. Subsequently the register translator 900 operates to send to the trunk selector repeater 1100 the digits 9, 2, 2, 1, 2, 3, and 4, whereby the trunk selector repeater 1100 repeats the digits noted over the trunk line 231 causing them to be registered in the register translator in the SP9 office, all in the manner previously explained. The subsequent completion of the present connection and the ultimate recording of items of record information in conjunction therewith are the same as previously explained.

Again reconsidering the operation of the register translator 900, it may occur that all of the trunks in the group 231, etc., are busy at this time, whereby the trunk selector repeater 1100 operates in the manner previously explained in order again to recycle the register translator 900 at the conclusion of the routing digit 8. In this case, the busy relay R1040 is again operated and the wiper carriage of the office route switch OR is operated an additional step in the rotary direction in order again to establish the routing digit 4 so that the first choice route, including the group of trunks 211, etc., may be again tested between the RA6 office and the WA2 office. In this case upon restoration of the busy relay R1040, the count relay R1020 is operated through its second step so as to interrupt, at the contacts 1021, the normal connection between the busy conductor 914 and the lower winding of the busy relay R1040. Thus, at this time, the register translator 900 operates to send the routing digit 4 followed by the registered digits in the manner previously explained. In the present case, should the group of trunks 211, etc., still be busy, the wiper carriage of the Strowger mechanism 1110 is rotated into its eleventh position; however, the register translator 900 is not recycled but sends the digits 9, etc., notwithstanding the all-trunks-busy condition of the trunk selector repeater 1100. In this case, the operated set of switch springs S1105 connects the busy tone conductor 1106 to the + conductor 662 and to the + conductor 612 of the trunk 610 after operation of the switch relay R640 at the conclusion of the sending of all of the digits from the register translator 900. Accordingly the busy-tone signal is returned over the loop circuit to the calling subscriber substation T1 indicating to the subscriber thereat that the present connection may not be established due to the busy condition mentioned.

When the subscriber at the calling subscriber substation T1 then disconnects, the line relay R1150 in the trunk selector repeater 1100 is restored effecting the restoration of the hold relay R1155 shortly thereafter. Upon restoring the hold relay R1155 completes, at the contacts 1157, the multiple circuits for operating the tabulator relay R1145 and the release magnet M1117, whereby the wiper carriage of the Strowger mechanism 1110 is released and returned back into its normal rotary and vertical positions. The operation of the tabulator relay R1145 brings about the association of the tabulator 742, etc., with the outgoing link 600 in the manner previously explained so that the perforator 760 is controlled to produce perforations on the associated tape representing the items of record information that have been stored in the outgoing link 600 notwithstanding the all-trunks-busy condition that was encountered by the trunk selector repeater 1100. In the present example, there is no time item perforated in the tape associated with the perforator 760 indicating that the present connection was never completed.

Again reconsidering the operation of the register translator 900, it may occur that the subscriber at the calling subscriber substation T1 after initiating the call and dialing one or more of the office code digits fails to dial the other office code digit, or digits, or fails to dial the necessary numerical digits; in any case, there are occasions where the trunk 610 may be seized followed by seizure of the register translator 900 by the outgoing link 600, wherein an incomplete complement of digits are dialed to effect complete operation of the register translator 900, in the manner previously explained. In this case, the register translator 900 fails to operate completely and is not released; whereby the loop circuit from the calling subscriber line 7930 is retained to the line relay R620 in the outgoing link 600 and the loop circuit from the register translator 900 is retained to the line relay R1150 in the trunk selector repeater 1100. In this case when the subscriber at the calling subscriber substation T1 disconnects, the line relay R620 restores effecting the restoration of the hold relay R630 so that the cut-through relay R650 and the gang relay R660 are restored. Restoration of the gang relay R660 brings about the release of the register translator 900 and the consequent restoration of the line relay R1150 followed by the restoration of the hold relay R1155 and the release of the Strowger mechanism 1110 in the event it is operated. However the register relay R1135 occupies its operated position and the switch relay R640 occupies its restored position so that the tabulator relay R1145 is not operated incident to the restoration of the hold relay R1155. However the hold relay R1155 completes, at the contacts 1159', a circuit, including the contacts 1139' and 1188', for energizing the winding of the timer relay R1195, whereby the latter relay operates after a time interval that is somewhat greater than the normal release time interval due to the provision of the dash pot 1196'. Upon operating the timer relay R1195 completes, at the contacts 1196, an alternative circuit for operating the tabulator relay R1145 via the lower winding thereof so that the latter relay operates and completes, at its contacts 1149 and 1147, the holding circuit for energizing the upper winding thereof. The operated tabulator relay R1145 effects the association of an idle one of the tabulators 742, etc., with the outgoing link 600 so that the release relay R720 is operated to bring about the normal release of the outgoing link 600 and the trunk selector repeater 1100 in the manner previously explained. In this connection, upon restoring the register relay R1135 interrupts, at the contacts 1139', the circuit for energizing the winding of the timer relay R1195 so as to cause the latter relay to restore in order to interrupt, at the contacts 1196, the alternative circuit for energizing the lower winding of the tabulator relay R1145.

In view of the foregoing, it will be understood that incident to the normal release of the trunk selector repeater 1100 the tabulator relay R1145 is normally operated via the upper winding thereof, since the switch relay R640 occupies its operated position, and thereafter the associated tabulator 742, etc., effects operation of the release relay R720 so as to effect the restoration of the register relay R1135, well within the normal operating time of the timer relay R1195 so that the latter relay is not operated.

In the present example, the tabulator 742 associated with the outgoing link 600 controls the perforator 760 to record the items of record information that have been accumulated in the outgoing link 600 in the manner previously explained; however in this case only the digits comprising the identification of the calling subscriber line 7930 may be registered in the registers M700, C700, D700 and U700 in the outgoing link 600, there being no office code digits and numerical digits registered in the various registers R1, R2, etc. The recording by the perforator 760 of only the digits comprising the identification of the calling subscriber line 7930 is indicative of the circumstance that the outgoing link 600, etc., was seized together with the register translator 900, etc., but that the seized register translator 900, etc., did not receive enough digits to effect routing of the connection from the RA6 office.

*Section 6.—A call from the subscriber substation in the RA6 office to a subscriber substation in the SP9 office*

Considering now the extension of a call from a subscriber substation in the RA6 office to a subscriber substation in the SP9 office, such, for example, as a connection from the calling subscriber substation T1 in the RA6 office to the subscriber substation terminated by the subscriber line 1234 in the SP9 office, the subscriber at the calling subscriber substation T1 initiates the call and then dials the called office code SP9 (779) followed by the numerical designation 1234 of the called subscriber line. When the call is initiated at the calling subscriber substation T1, the finder-first selector link illustrated may be employed, whereby the finder 504 finds the calling subscriber line 7930 and the first selector 505 responds to the first office code digit 7. More particularly the first selector 505 responds to the first office code digit 7 to select the group of second selectors 506, etc., and then operates to select an idle second selector in the selected group. Specifically the first selector 505 may select the trunk 521 extending to the second selector 506. The second selector 506 then responds to the second office code digit 7 to select the corresponding group of trunks, including the trunk 610, and then operates to select an idle trunk in the selected group. Specifically the second selector 506 may select the trunk 610 extending to the outgoing link 600. In this case, the mark relay 77M in the outgoing link 600 is operated indicating that the first office code digit 7 and the second office code digit 7 are to be recaptured. In the outgoing link 600, the line relay R620, the hold relay R630, the cut-through relay R650 and the gang relay R660 are reoperated, assuming that the register translator 900 has been preselected for use by the outgoing link 600. In this case, the operated mark relay 77M completes at its contacts 4 and 5 paths for applying ground potential to the first and second skip conductors in the skip cable MX in order to effect operation of the register sequence switch RS in the register translator 900 from its home or first position into its third position in order that the wiper RS3 of the register sequence switch RS selects the third conductor in the cable RSC extending to the rotary magnet O34 of the third office code register O3. Also the application of ground potential to the first and second skip conductors in the skip cable MX effects operation of the corresponding set relays R935 and R945.

Upon operating the set relay R935 completes, at the contacts 936, the previously traced circuit for operating the rotary magnet O13 of the first office register O1 from the impulsing wheel 937; and upon operating the set relay R945 completes, at the contacts 948, a similar circuit, including the contacts 951, for operating the rotary magnet O24 of the second office register O2 from the impulsing wheel 937. Thus the first and second office registers O1 and O2 are simultaneously set to register the respective first office code digit 7 and the second office code digit 7. Also upon operating the set relay R945 interrupts, at the contacts 946, a point in the previously traced operating circuit for the rotary magnet OC11 of the office composite switch OC so that the wiper carriage of the office composite switch OC is not operated in the rotary direction incident to the registration of the third office code digit 9 in the third office register O3. Finally the set relay R945 prepares, at the contacts 947, an alternative circuit for operating the rotary magnet OC11 of the office composite switch OC in a manner more fully explained hereinafter.

More particularly the first office register O1 is operated to register the recaptured first office code digit 7, whereupon a circuit is completed for operating the transfer relay R940 via the wiper O11 and the engaged contact in the associated contact bank terminating the 7th conductor in the marking cable O1M, ground potential being applied to the 7th conductor mentioned at the contacts 7 of the operated mark relay 77M in the outgoing link 600. Similarly the second office register O2 is operated to register the recaptured second office code digit 7, whereupon a circuit is completed for operating the cutoff relay R950 via the wiper O22 and the engaged contact in the associated contact bank terminating the seventh conductor in the marking cable O2M, ground potential being applied to the seventh conductor mentioned at the contacts 8 of the operated mark relay 77M in the outgoing link 600. Upon operating the transfer relay R940 interrupts, at the contacts 942, the circuit for operating the rotary magnet O13 of the first office register O1; and upon operating the cutoff relay R950 interrupts, at the contacts 951, the circuit for operating the rotary magnet O24 of the second office register O2.

The third office code digit 9 dialed at the calling subscriber substation T1 is registered in the third office register O3, and the numerical digits are registered in the numerical registers N1, etc., all in the manner previously explained. In the present example, incident to the registration of the second numerical digit 2 in the second numerical register N2, the set of switch springs N25 is closed thereby completing a circuit, including the contacts 947 and 991 and the conductors 1017 and 1018, for operating the rotary magnet OC11 of the office composite switch OC from the impulsing wheel 937, the vertical magnet OC10 of the office composite switch OC having been set incident to the registration of the first office code digit 7 in the first office register O1 in the manner previously explained. More particularly the rotary magnet OC11 operates and restores repeatedly driving the wiper carriage of the office composite switch OC step by step in the rotary direction until the rotary control wiper OC9 thereof engages the contact in the associated contact bank terminating the conductor that is engaged by the grounded wiper O31 of the third office register O3, the wiper O31 being grounded via a circuit including the contacts 947, the conductor 1017, the set of switch springs N25, the conductor 1018 and the impulsing wheel 937. In the present example, the wiper carriage of the office composite switch OC is driven nine steps in the rotary direction by virtue of the circumstance that the third office code digit 9 is registered in the third office register O3, whereby a circuit, also including the rotary control wiper OC9 of the office composite switch OC, is completed for operating the cutoff relay R990. Upon operating the cutoff relay R990 interrupts, at the contacts 991, the previously traced circuit for operating the rotary magnet OC11 so as to arrest further operation of the wiper carriage of the office composite switch OC at this time.

Accordingly at this time, the recaptured first and second office code digits 7 and 7 have been registered in the respective first and second office registers O1 and O2, and the third office code digit 9 dialed at the calling subscriber substation T1 has been registered directly in the third office register O3. The wiper carriage of the office composite switch OC has been set in the respective vertical and rotary directions in accordance with the first office code digit 7 and the third office code digit 9 respectively registered in the first and third office registers O1 and O3, and the seventh wiper OC7 of the wiper set has been selected by the registration of the second office code digit 7 in the second office register O2 in the manner previously explained. Subsequently when the third numerical digit 3 is registered in the third numerical register N3, the set of switch springs N35 is operated so that the office route switch OR is set in accordance with the setting of the office composite switch OC so as to produce a translation in the form of the single routing digit 8. Subsequently the register translator 900 proceeds to send the routing digit 8 followed by the digits 7, 7, 9, 1, 2, 3 and 4 in order to effect operation of the trunk selector repeater 1100 and the subsequent repeating over one of the trunk lines 231, etc., of the digits 7, 7, 9, 1, 2, 3 and 4 so as to effect the setting up of the present connection from the calling subscriber substation T1 in the RA6 office to the called subscriber substation in the SP9 office. The subsequent operation of the apparatus is the same as that described in Section 5, whereby the perforator 760 is ultimately controlled to record the times of record information, in the manner previously explained.

*Section 7.—A call from a subscriber substation in the RA6 office to a subscriber substation in the RA3 office*

Considering now the extension of a call from a subscriber substation in the RA6 office to a subscriber substation in the RA3 office, such, for example, as a connection from the calling subscriber substation T1 in the RA6 office to the subscriber substation terminated by the subscriber line 1234 in the RA3 office, the subscriber at the calling subscriber substation T1 initiates the call and then dials the called office code RA3 (723) followed by the numerical designation 1234 of the called subscriber line. When the call is initiated at the calling subscriber substation T1, the finder-first selector link illustrated may be employed, whereby the finder 504 finds the calling subscriber line 7930 and the first selector 505 responds to the first office code digit 7. More particularly the first selector 505 responds to the first office code digit 7 to select the group of second selectors 506, etc., and then operates to select an idle second selector in the selected group. Specifically the first selector 505 may select the trunk 521 extending to the second selector 506. The second selector 506 then responds to the second office code digit 2 to select the group of third selectors 507, etc., and then operates to select an idle third selector in the selected group. Specifically the second selector 506 may select the trunk 522 extending to the third selector 507. The third selector 507 then responds to the third office code digit 3 to select the corresponding group of trunks, including the trunk 610, and then operates to select an idle trunk in the selected group. Specifically the third selector 507 may select the trunk 610 extending to the outgoing link 600. In this case, the mark relay 723M in the outgoing link 600 is operated indicating that the first office code digit 7, the second office code digit 2, and the third office code digit 3 are to be recaptured. In the outgoing link 600, the line relay R620, the hold relay R630, the cut-through relay R650 and the gang relay R660 are operated, assuming that the register translator 900 has been preselected for use by the outgoing link 600. In this case, the operated mark relay 723M completes, at its 4, 5 and 6 contacts, paths for applying ground potential to the first, second and third skip conductors in the skip cable MX in order to effect operation of the register sequence switch RS in the register translator 900 from its home or first position into its fourth position in order that the wiper RS3 of the register sequence switch RS selects the fourth conductor in the cable RSC extending to the rotary magnet N12 of the first numerical register N1. Also the application of ground potential to the first, second and third skip conductors in the skip cable MX effects operation of the corresponding set relays R935, R945 and R955.

Upon operating the set relay R935 completes, at the contacts 936, the previously traced circuit for operating the rotary magnet O13 of the first office register O1 from the impulsing wheel 937; upon operating the set relay R945 completes, at the contacts 948, the previously traced circuit for operating the rotary magnet O24 of the second office register O2 from the impulsing wheel 937; and upon operating the set relay R955 prepares, at the contacts 956, a point in a chain circuit traced hereinafter, for operating the rotary magnet O34 of the third office register O3 from the impulsing wheel 937. Thus the first and second office registers O1 and O2 are simultaneously set to register the respective first office code digit 7 and the second office code digit 2. More particularly the first office register O1 is operated to register the recaptured first office code digit 7 whereupon a circuit is completed for operating the transfer relay R940 via the wiper O11 and the engaged contact in the associated contact bank terminating the seventh conductor in the marking cable O1M, ground potential being applied to the seventh conductor mentioned at the contacts 7 of the operated mark relay 723M in the outgoing link 600. Similarly the second office register O2 is operated to register the recaptured second office code digit 2, whereupon a circuit is completed for operating the cutoff relay R950 via the wiper O22 and the engaged contact in the associated contact bank terminating the second conductor in the marking cable O2M, ground potential being applied to the second conductor mentioned, at the contacts 8 of the operated mark relay 723M in the outgoing link 600. Upon operating the transfer relay R940 interrupts, at the contacts 942, the circuit for operating the rotary magnet O13 of the first office register O1; and completes, at the contacts 941, a similar circuit, including the contacts 936, 956 and 961, for operating the rotary magnet O34 of the third office register O3 from the impulsing wheel 937. Upon operating the cutoff relay R950 interrupts, at the contacts 951, the circuit for operating the rotary magnet O24 of the second office register O2. The third office register O3 is operated to register the recaptured third office code digit 3, whereupon a circuit is completed, for operating the cutoff relay R960 via the wiper O32 and the engaged contact in the associated contact bank terminating the third conductor in the marking cable O3M, ground potential being applied to the third conductor mentioned at the contacts 9 of the operated mark relay 723 in the outgoing link 600. Upon operating the cutoff relay R960 interrupts, at the contacts 961, the circuit for operating the rotary magnet O34 of the third office register O3.

The first numerical digit 1 dialed at the calling subscriber substation T1 is registered in the first numerical register N1, and the remainder of the numerical digits are registered in the remainder of the numerical registers N2, etc., all in the manner previously explained. In the present example, incident to the registration of the second numerical digit 2 in the second numerical register N2, the set of switch springs N25 is closed thereby completing the previously traced circuit for operating the rotary magnet OC11 of the office composite switch OC, the vertical magnet OC10 of the office composite switch OC having been set incident to the registration of the first office code digit 7 in the first office register O1, in the manner previously explained. In the present example when the rotary control wiper OC9 of the office composite switch OC is driven three steps in the rotary direction away from its normal rotary position, the cutoff relay R990 is operated in order to arrest further operation of the rotary magnet OC11, in the manner previously explained.

Accordingly at this time, the recaptured first, second and third office code digits 7, 2 and 3 have been registered in the respective first, second and third office registers O1, O2 and O3, and the first numerical digit 1 dialed at the calling subscriber substation T1 has been registered directly in the first numerical register N1, the wiper carriage of the office composite switch OC has been set in the respective vertical and rotary directions in accordance with the first office code digit 7 and the third office code digit 3 respectively registered in the first and third office registers O1 and O3 and the second wiper OC2 of the wiper set has been selected by the registration of the second office code digit 2 in the second office register O2 in the manner previously explained. Subsequently when the third numerical digit 3 is registered in the third numerical register N3, the set of switch springs N35 is operated so that the office route switch OR is set in accordance with the setting of the office composite switch OC, so as to produce a translation in the form of the single routing digit 2. Subsequently the register translator 900 proceeds to send the routing digit 2 followed by the digits 7, 2, 3, 1, 2, 3 and 4 in order to effect operation of the trunk selector repeater 1100 and the subsequent repeating over one of the trunk lines 310, etc., of the digits 7, 2, 3, 1, 2, 3 and 4 so as to effect the setting up of the present connection from the calling subscriber substation T1 in the RA6 office to the called subscriber substation in the RA3 office.

More particularly the trunk selector repeater 1100 may operate to select the trunk 315 extending to the trunk circuit 300, assuming that the trunk line 310 extending between the calling RA6 office and the called RA3 office is idle at this time. The trunk 315 is marked as idle to the Strowger mechanism 1110 of the trunk selector repeater 1100 by the presence of battery potential via the winding of the switch relay R340 and the contacts 353, upon the control conductor 318 thereof. When the trunk selector repeater 1100 seizes the trunk 315, ground potential is forwarded over the test wiper 1113 carried by the wiper carriage of the Strowger mechanism 1110 to the control conductor 318 of the trunk 315 effecting operation of the switch relay R340 in the trunk circuit 300. Upon operating the switch relay R340 interrupts, at the contacts 341 and 343 the normal connections between the upper and lower windings of the line relay R325 and the line conductors 311 and 312 of the trunk line 310; and completes, at the contacts 342 and 344, connections, including the contacts 321 and 323, between the line conductors 317 and 316 of the trunk 315 and the line conductors 311 and 312 of the trunk line 310, the winding of the series relay R330 being included in the connection between the conductors 316 and 312. Accordingly at this time the loop circuit extending from the upper winding of the answer relay R1160 in the trunk selector repeater 1100 is forwarded via the trunk 315, the trunk circuit 300 and the trunk line 310 to the trunk circuit terminating the trunk line 310 in the called RA3 office, whereby the series relay R330 is energized in this loop circuit and operates. Upon operating the series relay R330 completes, at the contacts 331, a circuit for operating the hold relay R335, whereby the latter relay completes, at the contacts 336, a holding circuit for retaining operated the switch relay R340 and a multiple path for applying ground potential to the control conductor 318 of the trunk 315 in order to retain the trunk selector repeater 1100 in its operated position and to retain the trunk 315 marked as busy to the other trunk selector repeaters, as well as the trunk selectors 450, etc., having access thereto.

The trunk circuit terminating the trunk line in the called RA3 office effects operation of the associated line switch so as to select an idle incoming link, the finder of which having previously selected an idle register translator in the RA3 office. Accordingly the loop circuit extending from the upper winding of the answer relay R1160 in the trunk selector repeater 1100 is completed to the line relay in the incoming link in the RA3 office. Accordingly when the line relay R1150 in the trunk selector repeater 1100 receives the digits 7, etc., from the register translator 900, the digits 7, etc., are repeated by the last mentioned line relay and registered in the register translator in the RA3 office. The register translator in the RA3 office after registering the digits 7, etc., controls the trunk selector associated with the incoming link in use to extend the connection to the local switch train, whereby the trunk selector mentioned is ultimately switched-through so that the loop circuit extending from the upper winding of the answer relay R1160 in the trunk selector repeater 1100 is extended to the connector in the local switch train in the RA3 office which connector is operated to seize the called suscriber line 1234 therein. The connector in the local switch train in the RA3 office operates to test the idle or busy condition of the called subscriber line 1234 therein; and assuming that the last mentioned line is idle at this time, ringing current is projected thereover and ring-back current is returned over the above traced loop circuit and repeated between the windings 1133, 1134 and the windings 1131, 1132 of the repeater 1130 to the calling subscriber substation T1 in the RA6 office. Subsequently, when the call is answered by the subscriber at the called subscriber substation, the connector in the local switch train in the RA3 office operates to reverse the polarity of the loop circuit extending back over the trunk line 310 to the upper winding of the answer relay R1160 in the trunk selector repeater 1100, whereby the answer relay R1160 in the trunk selector repeater 1100 is operated and the series relay R330 in the trunk circuit 300 is retained in its operated position.

At the conclusion of the established connection when the subscriber at the called subscriber substation in the RA3 office disconnects, the answer relay R1160 is restored; and when the subscriber at the calling subscriber substation T1 in the RA6 office disconnects, the line relay R1150 is restored. Restoration of the answer relay R1160 effects arresting of the operation of the timer 780 and restoration of the line relay R1150 interrupts the loop circuit, at the contacts 1151, extending over the trunk line 310, to the apparatus in the called RA3 office so as to effect the release of the apparatus in the RA3 office. Also the series relay R330 in the trunk circuit 300 restores, interrupting, at the contacts 331, the circuit for retaining operated the hold relay R335 so that the latter relay restores shortly thereafter, it being of the slow-to-release type. Upon restoring the hold relay R335 interrupts, at the contacts 336, the holding circuit for retaining operated the switch relay R340 and removes ground potential from the control conductor 318 of the trunk 315. Upon restoring the switch relay R340 recompletes, at the contacts 341 and 343, the normal connections between the upper and lower windings of the line relay R325 and the line conductors 311 and 312 of the trunk line 310.

When ground potential is removed from the control conductor 318 of the trunk 315, the switch relay R1180 in the trunk selector repeater 1100, restores effecting the operation of the release magnet M1117 and the tabulator relay R1145, whereby one of the tabulators 742, etc., is connected to the outgoing link 600 and governs the associated perforator 760, in the manner explained in Section 5. The final release of the outgoing link 600, the tabulator 742, and the perforator 760 are the same as those explained in Section 5.

*Section 8.—Completion of a connection in the RA6 office that originated in another office*

Considering now the completion of a connection to a called subscriber substation in the RA6 office that originated at a calling subscriber substation in another office, such, for example, as a call from a calling subscriber substation in the RA3 office to the called subscriber substation T1 in the RA6 office, the subscriber at the calling subscriber substation in the RA3 office initiates the call and dials the called office code RA6 (726) followed by the directory number of the called subscriber line 7930 extending to the called subscriber substation T1 in the RA6 office. The apparatus in the calling RA3 office is controlled in order to cause the trunk selector repeater individual to the outgoing link therein to select an idle trunk extending to a trunk circuit terminating an idle one of the trunk lines 310, etc., extending between the RA3 office and the RA6 office. For example, the register sender in use in the RA3 office may govern the trunk selector repeater therein so that the trunk extending to the trunk circuit terminating the particular trunk line 310 is selected, whereby a loop circuit is completed from the upper winding of the answer relay in the trunk selector repeater in the calling RA3 office over the line conductors 311 and 312 of the trunk line 310 to the upper and lower windings of the line relay R325 in the trunk circuit 300. This loop circuit includes the contacts 341, 343, 321 and 323, whereby the line relay R325 is operated. Upon operating the line relay R325 completes, at the contacts 326, a circuit for operating the hold relay R350. Upon operating the hold relay R350 interrupts, at the contacts 353, the normally completed path for applying battery potential via the winding of the switch relay R340 to the control conductor 318 of the trunk 315; and completes, at the contacts 354, a path for applying ground potential to the control conductor 318. The application of ground potential to the control conductor 318 of the trunk 315 marks the trunk 315 and consequently the trunk circuit 300 as busy to the trunk selector 450, etc., and to the trunk selector repeaters 1100, etc., in the RA6 office. Also the hold relay R350 completes, at the contacts 351, a connection from the test wiper 373 of the line switch 370 to battery potential via the contacts 363 and 375 and the rotary magnet M374 of the line switch 370, whereby the rotary magnet M374 is operated buzzer-fashion in search of an idle one of the incoming links. Assuming that the incoming link 400 is the first idle incoming link in the associated group, the absence of ground potential upon the control conductor 408 thereof prevents further operation of the rotary magnet M374 when the wipers 371, 372 and 373 of the line switch 370 engage the contact set terminating the conductors 406, 407 and 408 of the trunk 405 extending to the incoming link 400. In passing, it is noted that ground potential appears upon the control conductor 408 of the trunk 405 when the incoming link 400 is busy; and no ground potential appears upon the control conductor 408 when the incoming link 400 is idle. When the line switch 370 thus selects the trunk 405, a series circuit is completed for energizing the winding of the switchthrough relay R360 in the trunk circuit 300 and the rotary magnet M374 of the line switch 370, which circuit includes the contacts 352 and 375. When this series circuit is thus completed, the switchthrough relay R360 operates; however the rotary magnet M374 does not operate due to the series resistance of the winding of the switchthrough relay R360. Upon operating the switchthrough relay R360 interrupts, at the contacts 363, the test connection between the test wiper 373 of the line switch 370 and the rotary magnet M374 thereof; and completes, at the contacts 364, a direct path for applying ground potential to the test wiper 373 of the line switch 370 and consequently to the control conductor 408 of the trunk 405 extending to the incoming link 400. Also the switchthrough relay R360 prepares, at the contacts 361 and 362, a connection between the line conductors 311 and 312 of the trunk line 310 and the line conductors 406 and 407 of the trunk 405; and completes, at the contacts 365, a circuit, including the contacts 355, for operating the switch relay R320. Upon operating the switch relay R320 interrupts, at the contacts 321 and 323, the previously traced loop circuit extending via the trunk line 310 to the upper and lower windings of the line relay R325; and completes, at the contacts 322 and 324, an alternative loop circuit extending over the trunk line 310 to the lower and upper windings of the line relay R410 in the selected incoming link 400. This loop circuit extends from the line conductor 311 of the trunk line 310 via the contacts 322 and 361 to the line wiper 371 of the line switch 370 and thence via the line conductor 406 of the trunk 405, the contacts 431 and the lower winding of the line relay R410 to battery potential. Also this loop circuit extends from the line conductor 312 of the trunk line 310 via the contacts 324, the winding of the series relay R345 and the contacts 362 to the line wiper 372 of the line switch 370 and thence via the line conductor 407 of the trunk 405, the contacts 433, and the upper winding of the line relay R410 to ground potential. Accordingly when this loop circuit is completed, the series relay R345 and the line relay R410 operate. Upon operating the series relay R345 completes, at the contacts 346, an alternative holding circuit for retaining operated the hold relay R350, notwithstanding the restoration of the line relay R325, the hold relay R350 being of the slow-to-release type. Upon operating the line relay R410 completes, at the contacts 411, a circuit for operating the hold relay R415; and upon operating the hold relay R415 completes, at the contacts 416, a multiple path for applying ground potential to the control conductor 408 of the trunk 405 in order to insure marking thereof as busy to the other line switches having access thereto.

Considering now the normal cooperation between the incoming link 400 and the various register translators 900, etc., it is noted that the finder 440 individual to the incoming link 400 preselects an idle one of the register translators 900, etc., prior to seizure of the incoming link 400, by one of the line switches 370, etc. Specifically battery potential is applied in the incoming link 400 via the rotary magnet M446, the contacts 447, 437 and 423 to the wiper 442 of the finder 440; and the wiper 442 engages one of the control conductors 1015, etc., extending to one of the register translators 900, etc. In the present example, it is assumed that the register translator 900 is idle, whereby battery potential is applied therein via the winding of the seize relay R1050, the conductor 1016 and the contacts 1011' to the control conductor 1015 thereof appearing before the finder 440; however in the event the register translator 900 becomes busy before the incoming link 400 is seized, ground potential is applied to the control conductor 1015 thereof, whereby a buzzer circuit is completed for operating the rotary magnet M446 of the finder 440 so as to operate the wiper 442 thereof to disengage the control conductor 1015 extending to the particular register translator 900 and to engage a control conductor extending to an idle register translator as evidenced by the presence of battery potential thereof. The buzzer circuit noted extends when completed from the grounded control conductor 1015, etc., engaged by the wiper 442 of the finder 440 and thence via the contacts 423, 437 and 447 and the rotary magnet M446 to battery potential. When the wiper 442 engages a control conductor extending to an idle one of the register translators 900, etc., the presence of battery potential upon the control conductor thereof effects short-circuiting of the rotary magnet M446 of the finder 440 and the consequent arresting of operation thereof so that the finder 440 preselects the idle register translator noted to be used the next time the incoming link 400 is seized.

In conjunction with the operation of the register translator 900, etc., it is again noted that when all of the register translators 900, etc., are busy, the all-busy relay R1010 is operated, whereby the latter relay interrupts, at the contacts 1011', etc., the various connections for applying ground potential to the control conductors 1015, etc., appearing before the various finders 440, etc., so as to prevent useless operation of the finders 440, etc., at this time when all of the register translators 900, etc., are busy. Further the all-busy relay R1010 completes, at the contacts 1014', etc., paths for applying ground potential to the busy conductors 1014, etc., extending to the various incoming links 400, etc. The application of ground potential to the busy conductor 1014 completes a path, including the contacts 418, for applying ground potential to the control conductor 408 of the trunk 405 in order artificially to mark the trunk 405 and the incoming link 400 as busy to the various line switches 370, etc., when all of the register translators 900, etc., are busy.

Continuing now with the operation of the incoming link 400, upon operating the hold relay R415 completes, at the contacts 417, a circuit, including the contacts 436 and 447, for energizing in series relation the winding of the cut-through relay R420 and the rotary magnet M446 of the finder 440, whereby the cut-through relay R420 operates but the rotary magnet M446 does not operate due to the resistance of the winding of the cut-through relay R420. Upon operating the cut-through relay R420 interrupts, at the contacts 423 the normal connection between the rotary magnet M446 and the wiper 442 of the finder 440; and completes, at the contacts 422, a direct path for applying ground potential to the wiper 442 of the finder 440 and consequently to the control conductor 1015 extending to the selected register translator 900 in order to mark the register translator 900 as busy to the other finders having access thereto. Finally the cut-through relay R420 completes, at the contacts 421, etc., connections between the various conductors in the incoming link 400 and the various conductors 911, etc., extending to the register translator 900. Specifically the application of ground potential to the control conductor 1015 completes the previously traced circuit for operating the seize relay R1050 in the register translator 900. At this time the conductors 912 and 913 in the cable 910 are connected together at the multiple contacts 1062 and DS5 and thence via the wipers 443 and 444 of the finder 440, the contacts 424, 425, 493 and 491 to the upper and lower windings of the line relay R465 in the trunk selector 450 individual to the incoming link 400, whereby the latter relay operates. Upon operating the line relay R465 completes, at the contacts 466, a circuit, including the contacts 497 for operating the hold relay R470. Upon operating the hold relay R470 completes, at the contacts 471, a further multiple path for applying ground potential to the control conductor 408 of the trunk 405.

At this time, the seizure of the trunk line 310 in the calling RA2 office has effected seizure of the trunk circuit 300 and operation of the associated line switch 370 to effect seizure of the incoming link 400 and the individual trunk selector 450 as well as seizure of the register translator 900 that was preselected by the finder 440 individual to the incoming link 400. Accordingly when the first code digit 7 is transmitted by the register translator in the calling RA3 office, the series relay R345 in the trunk circuit 300 and the line relay R410 in the incoming link 400 follow. More particularly each time the series relay R345 restores and then reoperates it completes and then interrupts, at the contacts 346, the circuit for retaining operated the hold relay R350, whereby the latter relay is retained in its operated position during impulsing since it is of the slow-to-release type. Each time the line relay R410 restores and then reoperates it interrupts and then recompletes, at the contacts 411, the circuit for retaining operated the hold relay R410, whereby the latter relay is retained in its operated position during impulsing since it is of the slow-to-release type. Also each time the line relay R410 restores and then reoperates it completes and then interrupts, at the contacts 413, a path, including the contacts 421 and the wiper 441 of the finder 440, for applying ground potential to the conductor 911 in the cable 910, in order to effect operation of the series relay R920 and stepping of the rotary magnet O13 of the first office register switch O1 in the register translator 900. The series relay R920 operates and remains operated during impulsing as it is of the slow-to-release type; while the rotary magnet O13 of the first office register O1 is operated repeatedly since the wiper RS3 of the register sequence switch RS engages the home or first contact in the associated contact bank terminating the first conductor in the cable RSC extending to the rotary magnet O13 of the first office register O1. Recapitulating: the line relay R410 receives the first office code digit 7 over the loop circuit extending via the trunk line 310 from the calling RA3 offices and repeats the impulses thereof via the conductor 911 so that the first office code digit 7 is registered in the first office register O1 in the register translator 900. The subsequent operation of the line relay R410 to receive the office code digits 2 and 6 and the numerical digits 7, 9, 3 and 0, and to repeat these digits effecting registration thereof in the corresponding office registers O2 and O3 and in the corresponding numerical registers N1, N2, N3 and N4 in the register translator 900 is the same as that previously explained. At the conclusion of the dialing of the digits noted, the loop circuit extending via the trunk line 310 is maintained in order to maintain operated the series relay R345 and the line relay R410.

Registration of the office digits 7, 2 and 6 in the respective office registers O1, O2 and O3 in the register translator 900 effects a corresponding setting of the office composite switch OC and a resulting corresponding setting of the office route switch OR, in the manner previously explained. In this case, the position of the wiper set of the office route switch OR may be assumed to be the 5-up-5-in position thereof, whereby a circuit is completed for energizing the winding of the terminate relay R980 since the present connection is to be terminated in the RA6 office. When the winding of the terminate relay R980 is thus energized, the latter relay operates shortly thereafter, it being of the slow-to-operate type, in order to complete, at the contacts 981, a holding circuit, including the grounded conductor 1016, for energizing the winding thereof. Also the terminate relay R980 completes, at the contacts 982, a path for applying ground potential to the multiple terminated in the sixth, seventh and eighth contacts appearing before the wiper SS1 of the send-sequence switch SS for a purpose more fully explained below. Also in this setting of the wiper set of the office route switch OR, the contacts respectively engaged by the wipers OR4 and OR5 are respectively strapped to the tenth and to the sixth conductors in the numerical cable N, whereas the contacts engaged by the remainder of the wipers OR6, OR7 and OR8 are strapped to the skip conductor SK. Accordingly in the sending operation of the register translator 900, the digit send switch DS sends first the digit "0" over the impulsing conductors 912 and 913 to the trunk selector 450, whereby the send sequence switch SS is operated into its second position so that the digit send switch DS sends the digit 6 over the impulsing conductors 912 and 913 so that the send sequence switch SS is operated into its third position. The send sequence switch SS is automatically operated from its third position through its fourth and fifth positions into its sixth position by virtue of the engagement of the wipers OR6, OR7 and OR8 with the contacts in the associated contact bank that are connected to the skip conductor SK, in the manner explained in Section 5. Moreover, in the present example, since the terminate relay R980 occupies its operated position, ground potential appears upon the sixth, seventh and eighth contacts appearing before the wiper SS1 of the send sequence switch SS, whereby the rotary magnet SS4 is operated buzzer-fashion to cause the wipers thereof to be driven into their ninth position. When the wiper SS3 of the send sequence switch SS engages the ninth contact in the associated contact bank terminating the fourth conductor in the cable SSC, the connection is extended to the wiper N11 of the first numerical register N1, whereby the register translator 900 operates to send the first numerical digit 7 registered in the first numerical register N1. Subsequently the register translator 900 operates to send the other numerical digits 9, 3 and 0. Recapitulating: since the wiper set of the office route switch OR was set in the present example into its 5-up-5-in position, the office route switch OR was set to send the two routing digits 0 and 6; and the terminate relay R980 was operated to cause the register sender to skip the registered office code digits 7, 2 and 6 corresponding to the called exchange code of the RA6 office. Thus in the present example, the register sender 900 after registering the digits 7, 2, 6, 7, 9, 3, 0 operates to send the two routing digits 0 and 6 followed by the numerical digits 7, 9, 3 and 0.

Specifically the line relay R465 in the trunk selector 450 follows the first routing digit 0. Each time the line relay R465 restores and then reoperates, it interrupts and then recompletes, at the contacts 466, the circuit for retaining operated the hold relay R470, whereby the latter relay is retained in its operated position during impulsing since it is of the slow-to-release type. Also each time the line relay R465 restores and then reoperates it completes and then interrupts, at the contacts 467, a circuit, including the contacts 497 and 472, for energizing in series relation the winding of the series relay R475 and the vertical magnet M455, whereby the series relay R475 operates and remains operated during impulsing as it is of the slow-to-release type.

The vertical magnet M455 is operated and restored ten times driving the wiper carriage of the Strowger mechanism 451 ten steps in the vertical direction away from its normal vertical position in order to select the group of trunks 241, etc., extending to the office selectors 240, etc. Also when the wiper carriage of the Strowger mechanism 451 is driven out of its normal vertical position, the sets of switch springs S459 and S460 are operated. More particularly the set of switch springs S459 is closed to complete a circuit, including the contacts 457 and 476, as well as the grounded conductor 408, for operating the step relay R480. Upon operating the step relay R480 completes, as the contacts 481, a holding circuit, including the set of switch springs S459 and the contacts 457, for energizing the winding thereof. At the conclusion of the routing digit 0, the line relay R465 is retained in its operated position retaining the hold relay R470 in its operated position and effecting restoration of the series relay R475 shortly thereafter, the latter relay being of the slow-to-release type. Upon restoring the series relay R475 interrupts, at the contacts 476 the initial operating circuit for the step relay R480; and completes, at the contacts 477, a circuit, including the contacts 482 and the grounded conductor 408, for operating the rotary magnet M456 so as to drive the wiper carriage of the Strowger mechanism 451 one step in the rotary direction away from its normal rotary position so that the first trunk line in the group of trunks 241, etc., is selected. Also the rotary magnet M456 interrupts, at the contacts 457, the holding circuit for retaining operated the step relay R480, whereby the latter relay interrupts, at the contacts 482, the circuit for retaining operated the rotary magnet M456. Upon restoring the rotary magnet M456 completes, at the contacts 457, a test connection, including the set of switch springs S459 and the contacts 495, between the winding of the step relay R480 and the test wiper 454 carried by the wiper carriage of the Strowger mechanism 451 so that the idle or busy condition of the first trunk in the selected group is tested. Assuming that the first trunk mentioned is busy, the presence of ground potential upon the control conductor thereof completes a circuit substantially identical to that traced above for reoperating the step relay R480 so as to effect reoperation of the rotary magnet M456 and the consequent driving of the wiper carriage of the Strowger mechanism 452 an additional step in the rotary direction.

Assuming that the trunk 241 is the first idle trunk in the previously selected group, the absence of ground potential upon the control conductor thereof interrupts a normally completed path, including the contacts 495 and the grounded conductor 408 for short-circuiting the winding of the switch relay R490, whereby a series circuit, including the grounded conductor 408, the set of switch springs S459 and the contacts 457 is completed for energizing the winding of the switch relay R490 and the winding of the step relay R480. When this series circuit is completed, the switch relay R490 operates; however the step relay R480 does not operate as it is of the marginal type. Upon operating the switch relay R490 completes, at the contacts 496, a direct connection between the grounded control conductor 408 of the trunk 405 and the control conductor of the trunk 241; and interrupts, at the contacts 495, a further point in the test connection between the winding of the step relay R480 and the test wiper 454. Also the switch relay R490 interrupts, at the contacts 491 and 493, the loop circuit extending to the line relay R465; and completes, at the contacts 492 and 494, connections extending the loop circuit via the line wipers 452 and 453 over the line conductors of the trunk 241 to the line relay in the office selector 240 effecting seizure thereof. Also upon operating the switch relay R490 in the trunk selector 450 interrupts, at the contacts 497 the circuit for energizing the winding of the hold relay R470 so as to cause the latter relay to restore shortly thereafter, it being of the slow-to-release type. Accordingly both the line relay R465 and the hold relay R470 in the trunk selector 450 restores; however without effect at this time.

Accordingly the loop circuit extending from the register translator 900 is completed via the trunk selector 450 and the trunk 241 to the line relay in the office selector 240, whereby the second routing digit 6 sent from the register translator 900 effects operation of the office selector 240. More particularly the office selector 240 operates to select the group of fourth selectors 508, etc., and then to select an idle fourth selector in the selected group. Specifically the office selector 240 may select the trunk 523 extending to the fourth selector 508. Thus the loop circuit from the register translator 900 is forwarded on into the fourth selector 508. The fourth selector 508 responds to the first numerical digit 7 and may ultimately select the trunk 524 extending to the fifth selector 509. The fifth selector 509 responds to the second numerical digit 9 and may ultimately select the trunk 525 extending to the connector 510. The connector 510 responds to the third numerical digit 3 and the fourth numerical digit 0 to select the subscriber line 7930 extending to the called subscriber substation T1 in the RA6 office. The subsequent operation of the connector 510 depends upon the idle or busy condition of the called subscriber substation T1 at this time; and assuming that the called subscriber substation T1 is idle the connector 510 operates to project ringing current over the subscriber line 7930 and to return ring-back tone current over the connection.

After the register translator 900 has sent all of the digits 0, 6, 7, 9, 3 and 0 registered therein over the impulsing conductors 912 and 913, in a manner identical to that described in Section 5, the send sequence switch SS is operated into its thirteenth position applying ground potential to the conductor 1084 and ultimately to the conductor 911 in the cable 910 so as to effect operation of the switch relay R430 in the incoming link 400. Upon operating the switch relay R430 completes, at the contacts 435 a holding circuit for energizing the winding thereof; interrupts, at the contacts 436, the circuit for retaining operated the cut-through relay R420; and interrupts, at the contacts 437, the normal connection between the rotary magnet M446 and the wiper 442 of the finder 440. Also the switch relay R430 interrupts, at the contacts 431 and 433, the loop circuit extending to the lower and upper windings of the line relay R410; and completes, at the contacts 432 and 434, a connection between the line conductors 406 and 407 of the trunk 405 and the line wipers 452 and 453 of the wiper set of the Strowger mechanism 451, whereby the loop circuit extending via the trunk line 310 is extended directly over the trunk circuit 300, the line switch 370, the trunk 405, the incoming link 400, the trunk selector 450, the trunk 241, the office selector 240, the trunk 523, the fourth selector 508, the trunk 524, the fifth selector 509 and the trunk 525 to the line relay in the connector 510. Accordingly the ring-back tone current returned from the connector 510 is returned over the loop circuit mentioned to the calling subscriber substation in the RA3 office.

Subsequently when the call is answered at the calling subscriber substation T1 in the RA6 office, the connector 510 operates to reverse the polarity of the loop circuit extending therefrom back over the connection, including the trunk line 310 to the calling RA3 office, whereby the series relay R345 in the trunk circuit 300 is retained in its operated position and the answer relay in the outgoing link in the calling RA3 office is operated so as to effect timing of the present connection for recording purposes, in the manner explained in Section 5.

Also incident to the operation of the switch relay R430 in the incoming link 400, the cut-through relay R420 and the line relay R410 restore; shortly thereafter the hold relay R415 restores, the latter relay being of the slow-to-release type. Upon restoring the cut-through relay R420 interrupts, at the contacts 421, etc., the connections between the incoming link 400 and the register translator 900; and the register translator 900 is released and rendered available for further use, in the manner explained in Section 5.

Subsequently at the conclusion of the established connection when the subscriber at the called subscriber substation T1 in the RA6 office disconnects, the connector 510 is controlled to restore the polarity over the loop circuit including the trunk line 310 so as to effect restoration of the answer relay in the outgoing link in the calling RA3 office in order to terminate timing of the present connection, in the manner explained in Section 5. Thereafter when the subscriber at the calling subscriber substation in the RA3 office disconnects the switching apparatus therein is released producing a recording of the items of record information in connection with the present connection, in the manner explained in Section 5. Also the loop circuit extending via the trunk line 310 is interrupted effecting the restoration of the series relay R345 in the trunk circuit 300 and the restoration of the line relay in the connector 510. Upon restoring the series relay R345 interrupts, at the contacts 346 the circuit for energizing the winding of the hold relay R350 in order to cause the latter relay to restore shortly thereafter, it being of the slow-to-release type. Upon restoring the hold relay R350 interrupts, at the contacts 355, the circuit for retaining operated the switch relay R320; and interrupts, at the contacts 352, the circuit for retaining operated the switchthrough relay R360. Upon restoring the switch relay R320 recompletes, at the contacts 321 and 323, the normal connections between the upper and lower windings of the line relay R325 and the line conductors 311 and 312 of the trunk line 310. Upon restoring the switchthrough relay R360 interrupts, at the contacts 364, the path for applying ground potential to the control conductor 408 of the trunk 405 thereby to interrupt the holding circuits for retaining operated the switch relays R490 and R430 so as to effect immediate restoration of the switch relay R490 and restoration of the switch relay R430 shortly thereafter, the latter relay being of the slow-to-release type. Upon restoring the switch relay R430 completes, at the contacts 431 and 433 the normal connections between the lower and upper windings of the line relay R410 and the line conductors 406 and 407 of the trunk 405. Upon restoring the switch relay R490 completes, at the contacts 497, a circuit, including the contacts 467 and 473 and the set of switch springs S460, for operating the release magnet M458 so as to effect the release of the wiper carriage of the Strowger mechanism 451 so that it is returned into its normal rotary and vertical positions. When the wiper carriage of the Strowger mechanism 451 is thus released, the sets of switch springs S459 and S460 are opened, the set of switch springs S460 being opened to effect the restoration of the release magnet M458. When the trunk selector 450 is thus released, the office selector 240, the fourth selector 508, the fifth selector 509 and the connector 510 are also released. At this time all of the apparatus involved in the established connection is completely released and available for further use.

*Section 9.—Trunking of a connection through the RA6 office in a tandem position*

Considering now the trunking of a connection through the RA6 office in a tandem position, this situation arises when, for example, a connection is extended from a calling subscriber substation in the RA3 office to a called subscriber substation in the WA2 office. The subscriber at the calling subscriber substation in the RA3 office initiates the call and dials the office code WA2 (922) and the called line designation, such as 1234. The apparatus in the RA3 office operates in a manner similar to that described in Section 5, whereby the trunk line 310 may be seized, causing the trunk circuit 300 to effect operation of the line switch 370 so that the incoming link 400 may be seized, the finder 440 having previously seized the idle register translator 900. In this case the register translator in the calling RA3 office then sends the digits 9, 2, 2, 1, 2, 3 and 4, whereby the digits noted are repeated by the line relay R410 to the register translator 900 and registered therein.

The registration of the office code digits 9, 2 and 2 in the office registers O1, O2 and O3 in the register translator 900 effects setting of the office composite switch OC and the consequent setting of the office route switch OR, in the manner explained in Section 8. However in this case the setting of the office route switch OR establishes the single routing digit 4, whereby the register translator 900 proceeds to send over the impulsing conductors 912 and 913 the routing digit 4 followed by the digits 9, 2, 2, 1, 2, 3 and 4. More particularly the line relay R465 in the trunk selector 450 responds to the routing digit 4 to select the group of trunks 214, etc., and then an idle trunk therein. For example the trunk selector 450 may select the trunk 214 extending to the trunk circuit 212 terminating the trunk line 211 extending between the RA6 office and the WA2 office. The switch relay R490 of the trunk selector 450 operates following operation of the trunk selector 450 to select the trunk 214, whereby the remainder of the digits 9, 2, 2, 1, 2, 3 and 4 are transmitted directly from the register translator 900 over the trunk line 211 and registered in a register translator in the called office WA2. At the conclusion of the sending by the register translator 900, the switch relay R430 in the incoming link 400 is operated so that the loop circuit from the outgoing link in the RA3 office is forwarded directly to the connector in the called WA2 office and the register translator 900 is released.

The switching apparatus in the called WA2 office operates in the manner described in Section 8, whereby the connection is extended to the called subscriber line in the WA2 office. Upon answering, the polarity is reversed over the loop circuit extending through the RA6 office so as to govern the answer relay in the trunk selector repeater in the RA3 office in order to control the timer in the outgoing link for recording purposes, in the manner explained in Section 5. When the subscriber at the called subscriber substation in the WA2 office disconnects, the connector therein restores the polarity over the loop circuit to the answer relay in the trunk selector repeater in the RA3 office; and when the subscriber at the calling subscriber substation in the RA3 office disconnects, all of the apparatus is released. More particularly the loop circuit extending through the RA6 office is interrupted bringing about the restoration of the series relay R345 in the trunk circuit 300 so as to effect the release of the trunk circuit 300 the incoming link 400, the trunk selector 450 and the trunk circuit 212, in a manner substantially identical to that described in Section 8. At this time, the established connection is completely released and the recording apparatus in the RA3 office is controlled to produce a record of the pertinent items in connection with the established connection in a similar manner as that described in Section 5.

*Section 10.—Conclusion*

In view of the foregoing description of the extension of a call from a calling subscriber substation in the RA6 office, to a called subscriber substation in the WA2 office set forth in Section 5, it will be understood that the apparatus in the RA6 office is controlled in a similar manner to effect the extension of calls to other offices involving called office codes having the first digits 3, 5, 8 and 9; and that the apparatus in other calling offices are operated in a similar manner when it may be determined from the first office code digit dialed that the call is to be routed from the calling office. In view of the foregoing description of the extension of a call from a calling subscriber substation in the RA6 office to a called subscriber substation in the SP9 office set forth in Section 6, it will be understood that the apparatus in the RA6 office is controlled in a similar manner to effect the extension of calls to other offices involving called office codes having the first two digit combinations: 74, 76 and 77; and that the apparatus in other calling offices are operated in a similar manner when it may be determined from the second office code digits dialed that the call is to be routed from the calling office. In view of the foregoing description of the extension of a call from a calling subscriber substation in the RA6 office to a called subscriber substation in the RA3 office set forth in Section 7, it will be understood that the apparatus in the RA6 office is controlled in a similar manner to effect the extension of calls to other offices involving called office codes having the three digit combinations: 721, 723 and 727; and that the apparatus in other calling offices are operated in a similar manner when it may be determined from the third office code digit dialed that the call is to be routed from the calling office. Also from the explanation of the mode of operation of the apparatus in the RA6 office to complete a connection to a called subscriber substation therein that originated in another office, set forth in Section 8, it will be understood that the apparatus in each of the other offices is operative in a similar manner to complete a connection to a called subscriber substation therein that originated in any one of the other offices. Further from the description of the apparatus in the RA6 office involved in trunking a connection therethrough in a tandem position set forth in Section 9, it will be understood that the apparatus in each other office may be controlled in a similar manner to trunk a connection therethrough in a tandem position.

Moreover in view of the descriptions appearing in Sections 3 to 9, inclusive, of the apparatus incorporated in the RA6 office, it will be understood that the register translator apparatus incorporated in each calling office is employed only when it is necessary to use such apparatus for translation purposes in the extension and completion of connections and that each register translator taken for use in each calling office and in each tandem office is employed on a "in-and-through" basis so that each register translator taken into use in each calling office, in each tandem office and in each called office ultimately receives the complete called office code and the complete line designation. The above mentioned arrangement permits ready and complete alternative trunking from any calling office or from any tandem office toward the called office.

Further in view of the explanation of the operation of the apparatus involved in the various offices as described in Sections 5, 8 and 9, it will be appreciated that in the extension of a connection from any calling office to any called office that an outgoing link is taken into use in the calling office so that incident to the release of the apparatus the associated tabulator and perforator equipment in the calling office may be controlled to make a record of the pertinent items of record information in connection therewith. Finally it will be appreciated that records produced in the calling offices are made incident to the release of the outgoing links therein and are made regardless of whether the connections routed through the outgoing links were ultimately completed. This arrangement provides an accurate and informative record of the use of the toll switching apparatus both in the extension of successful and unsuccessful calls. Of course in conjunction with successful toll calls, a time item is accumulated in the timer incorporated in the outgoing link in the calling office, whereby the record produced involves sufficient data so that a rate item and a charge item on a suitable basis may be ultimately produced for billing purposes.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a calling line, a link, automatic switching apparatus selectively operated by the dialing over said calling line of certain first office code digits and of certain combinations of first and second office code digits and of certain combinations of first and second and third office code digits to extend a connection from said calling line to said link, register apparatus including first and second and third office code digit registers and a number of numerical digit degisters and a sequence device having access to said office code digit registers and to said numerical digit registers, means governed by operation of said switching apparatus to extend said connection to said link for determining whether said switching apparatus was operated by a first office code digit or by a combination of first and second office code digits or by a combination of first and second and third office code digits and also for determining the value or values of the office code digit or digits involved in the operation of said switching apparatus, means governed by said determining means and controlled by the determination of a first office code digit for registering the value thereof in said first office code digit register and for operating said sequence device to select said second office code digit register and controlled by the determination of a combination of first and second office code digits for registering the values thereof respectively in said first and second office code digit registers and for operating said sequence device to select said third office code digit register and controlled by the determination of a combination of first and second and third office code digits for registering the values thereof respectively in said first and second and third office code digit registers and for operating said sequence device to select the first of said numerical digit registers, and means controlled by the next digit dialed over said calling line following operation of said switching apparatus to extend said connection to said link for registering said next digit in the one of said digit registers selected by said sequence device and then for operating said sequence device to select the successive one of said digit registers so that the individual office code digits and the individual numerical digits dialed over said calling line are respectively registered in the corresponding ones of said digit registers in said register apparatus regardless of the number of the office code digits employed in the operation of said switching apparatus to extend said connection from said calling line to said link.

2. The telephone system set forth in claim 1, wherein said determining means is arranged in said link.

3. The telephone system set forth in claim 1, and further comprising a trunk line, means controlled by said office code digits registered in said office code registers for establishing a connection between said link and said trunk line, a sender, and means for operating said sender to send over said trunk line said office code digits and said numerical digits respectively registered in said office code digit registers and in said numerical digit registers.

4. The telephone system set forth in claim 1, and further comprising a trunk line, a translator controlled by said office code digits registered in said office code digit registers for producing a routing digit, a sender, means for operating said sender to send to said link said routing digit produced by said translator and then said office code digits and said numerical digits respectively registered in said office code digit registers and in said numerical digit registers, means controlled by said routing digit sent to said link for establishing a connection between said link and said trunk line, and means for repeating over said trunk line said office code digits and said numerical digits sent to said link.

5. In a telephone system, a calling line, automatic switching apparatus, means for connecting said calling line to said switching apparatus, an outgoing link, said switching apparatus being operated by one or more office code digits dialed over said calling line to extend a connection from said calling line to said outgoing link, a plurality of register-senders, means for connecting said outgoing link to an idle first of said register-senders, means for recapturing said one or more office code digits employed in the operation of said switching apparatus to extend said connection from said calling line to said outgoing link and for registering said recaptured office code digit or digits in said first register-sender, means for registering the remainder of the office code digits and the numerical digits dialed over said calling line following the completion of said connection from said calling line to said outgoing link in said first register-sender, a calling trunk line, an incoming link, means for connecting said calling trunk line to said incoming link, means for connecting said incoming link to an idle second of said register-senders, means for registering the office code digits and the numerical digits sent over said calling trunk line in said second register-sender, a plurality of other trunk lines, and means controlled by the registration of said office code digits in any one of said register-senders for establishing a connection from said connected outgoing link or from said connected incoming link to an idle one of said other trunk lines and then for operating said one register-sender to send over said one other trunk line said office code digits and said numerical digits registered therein.

6. In a telephone system, a calling line, automatic switching apparatus, means for connecting said calling line to said switching apparatus, a called line, said switching apparatus being controlled by certain first and second and third office code digits and a number of numerical digits dialed over said calling line to establish a connection from said calling line to said called line, an outgoing link, said switching apparatus being controlled by one or more other office code digits dialed over said calling line to extend a connection from said calling line to said outgoing link, a plurality of register-senders, means for connecting said outgoing link to an idle first of said register-senders, means for recapturing said one or more office code digits employed in the operation of said switching apparatus to extend said connection from said calling line to said outgoing link and for registering said recaptured office code digit or digits in said first register-sender, means for registering the remainder of the office code digits and the numerical digits dialed over said calling line following the completion of said connection from said calling line to said outgoing link in said first register-sender, a calling trunk line, an incoming link, means for connecting said calling trunk line to said incoming link, means for connecting said incoming link to an idle second of said register-senders, means for registering the office code digits and the numerical digits sent over said calling trunk line in said second register-sender, a plurality of other trunk lines, and means controlled by the registration of said office code digits in any one of said register-senders for establishing a connection from said connected outgoing link or from said connected incoming link to an idle one of said other trunk lines and then for operating said one register-sender to send over said one other trunk line said office code digits and said numerical digits registered therein.

7. In a telephone system including a plurality of offices interconnected by trunk lines; each one of said offices comprising subscriber lines, outgoing links, incoming links, first automatic switching apparatus operated by certain digits dialed over a calling subscriber line in said one office to complete a connection therefrom to a called first subscriber line in said one office and operated by other digits dialed over a calling subscriber line in said one office to extend a connection therefrom to an idle one of said outgoing links, register-senders, means for connecting said one outgoing link to an idle first of said register-senders, means for recapturing said digit or digits employed in said operation of said first switching apparatus to seize said one outgoing link and for registering said recaptured digit or digits in said first register-sender, additional means for registering in said first register-sender the other digits dialed over said calling subscriber line following the extension of said connection from said calling subscriber line to said one outgoing link, means controlled by said first register-sender for completing a connection from said one outgoing link to a called first of said trunk lines and then for sending all of said digits registered therein over said first trunk line, means for connecting a calling second of said trunk lines to an idle one of said second incoming links, means for connecting said one incoming link to an idle second of said register-senders, means for registering in said second register-sender all of the digits sent over said second trunk line, second automatic switching apparatus, means controlled by said second register-sender for connecting said one incoming link to said second switching apparatus and then for sending digits thereto in order to operate said second switching apparatus to complete a connection to a called second subscriber line in said one office, and additional means controlled by said second register-sender for completing a connection from said one incoming link to a called second of said trunk lines and then for sending all of the digits registered therein over said second trunk line.

8. In a telephone system, a calling line, a plurality of links, automatic switching apparatus operated by one or more digits dialed over said calling line for extending a connection from said calling line to one of said links, means controlled by the extension of said connection from said calling line to said one link for identifying the numerical designation of said calling line and for registering the digits of said identified numerical designation in said one link, a register-sender, recapture relay means provided in said one link for recapturing said one or more digits employed in said operation of said switching apparatus to extend said connection from said calling line to said one link and for registering said recaptured one or more digits in said register-sender, repeat relay means provided in said one link for receiving and for registering in said register-sender other digits dialed over said calling line following the extension of said connection from said calling line to said one link, a called line, and means governed by said register-sender for completing a connection from said one link to said called line and for registering in said one link all of said digits registered in said register-sender.

9. In a telephoning system, a calling line, a plurality of links, automatic switching apparatus operated by one or more control digits dialed over said calling line for extending a connection from said calling line to one of said links, means controlled by the extension of said connection from said calling line to said one link for identifying the numerical designation of said calling line and for registering the digits of said identified numerical designation in said one link, a register-sender, recapture relay means provided in said one link for recapturing said one or more control digits employed in said operation of said switching apparatus to extend said connection from said calling line to said one link and for registering said recaptured one or more control digits in said register-sender, repeat relay means provided in said one link for receiving and for registering in said register-sender other control digits dialed over said calling line following the extension of said connection from said calling line to said one link, a selector-repeater terminating said one link, a trunk line, means included in said register-sender and controlled by certain of said control digits registered therein for producing a routing digit and for sending said routing digit and then all of said control digits registered therein to said selector-repeater, said selector-repeater being operated by said routing digit to select said trunk line and then being operated to repeat all of said control digits over said trunk line, and additional means for registering in said one link all of said control digits repeated over said trunk line.

10. In a telephone system, register apparatus comprising three office code digit registers, a number of numerical digit registers, a register sequence switch having access to all of said digit registers and normally selecting the first of said office code digit registers, three control conductors, means for selectively marking with a marking potential said three control conductors, three sets of office code digit conductors, means for selectively marking with a marking potential said three sets of office code digit conductors, means responsive to marking of the first of said control conductors for operating said register sequence switch to select the second of said office code digit registers and for operating the first of said office code digit registers to register a first office code digit as marked by the first set of said office code digit conductors, means responsive to marking of the second of said control conductors for operating said register sequence switch to select the third of said office code registers and for operating the second of said office code digit registers to register a second office code digit as marked by the second set of said office code digit conductors, means responsive to marking of the third of said control conductors for operating said register sequence switch to select the first of said numerical digit registers and for operating the third of said office code digit registers to register a third office code digit as marked by the third set of said office code digit conductors, a digit conductor, and means responsive to the reception of a digit sent over said digit conductor for registering the received digit in the one of said digit registers selected by said register sequence switch and then for operating said register sequence switch to select the next adjacent one of said digit registers.

11. In a telephone system, a register-translator comprising three office code digit registers, a number of numerical digit registers, a register sequence switch having access to all of said digit registers and normally selecting the first of said office code digit registers, three control conductors, means for selectively marking with a marking potential said three control conductors, three sets of office code digit conductors, means for selectively marking with a marking potential said three sets of office code digit conductors, means responsive to marking of the first of said control conductors for operating said register sequence switch to select the second of said office code digit registers and for operating the first of said office code digit registers to register a first office code digit as marked by the first set of said office code digit conductors, means responsive to marking of the second of said control conductors for operating said register sequence switch to select the third of said office code digit registers and for operating the second of said office code digit registers to register a second office code digit as marked by the second set of said office code digit conductors, means responsive to marking of the third of said control conductors for operating said register sequence switch to select the first of said numerical digit registers and for operating the third of said office code digit registers to register a third office code digit as marked by the third set of said office code digit conductors, a digit conductor, means responsive to the reception of a digit sent over said digit conductor for registering the received digit in the one of said digit registers selected by said register sequence switch and then for operating said register sequence switch to select the next adjacent one of said digit registers, a translator mechanism, means controlled by said three office code digits registered in said three office code digit registers for operating said translator mechanism to register one or more routing digits, and means for sending said one or more routing digits registered in said translator mechanism and then said office code digits registered in said office code digit registers and finally said numerical digits registered in said numerical digit registers.

12. In a telephone system, a register-translator comprising three office code digit registers, a number of numerical digit registers, a register sequence switch having access to all of said digit registers and normally selecting the first of said office code digit registers, three control conductors, means for selectively marking with a marking potential said three control conductors, three sets of office code digit conductors, means for selectively marking with a marking potential said three sets of office code digit conductors, means responsive to marking of the first of said control conductors for operating said register sequence switch to select the second of said office code digit registers and for operating the first of said office code digit registers to register a first office code digit as marked by the first set of said office code digit conductors, means responsive to marking of the second of said control conductors for operating said register sequence switch to select the third of said office code digit registers and for operating the second of said office code digit registers to register a second office code digit as marked by the second set of said office code digit conductors, means responsive to marking of the third of said control conductors for operating said register sequence switch to select the first of said numerical digit registers and for operating the third of said office code digit registers to register a third office code digit as marked by the third set of said office code digit conductors, a digit conductor, means responsive to the reception of a digit sent over said digit conductor for registering the received digit in the one of said digit registers selected by said register sequence switch and then for operating said register sequence switch to select the next adjacent one of said digit registers, a translator mechanism, an office code relay, means controlled by said three office code digits registered in said three office code digit registers for selectively operating said translator mechanism to register one or more routing digits and for selectively operating said office code relay, and means for sending said one or more routing digits registered in said translator mechanism and then for selectively sending said office code digits registered in said office code digit registers depending upon the position of said office code relay and finally for sending said numerical digits registered in said numerical digit registers.

13. In a telephone system, a calling line, automatic switching apparatus, means for connecting said calling line to said switching apparatus, a link, said switching apparatus being operated by certain first office code digits dialed over said calling line to seize said link and being operated by certain combinations of first and second office code digits dialed over said calling line to seize said link and being operated by certain combinations of first and second and third office code digits dialed over said calling line to seize said link, three control conductors, three sets of office code digit conductors, means controlled by operation of said switching apparatus by a first office code digit to seize said link for marking with a marking potential the first of said control conductors and for marking with a marking potential the value of said first office code digit upon the first set of said office code digit conductors and controlled by operation of said switching apparatus by a combination of first and second office code digits to seize said link for marking with a marking potential the first and second of said control conductors and for marking with a marking potential the value of said first and second office code digits respectively upon the first and second sets of said office code digit conductors and controlled by operation of said switching apparatus by a combination of first and second and third office code digits to seize said link for marking with a marking potential the first and second and third of said control conductors and for marking with a marking potential the values of said first and second and third office code digits respectively upon the first and second and third sets of said office code digit conductors, a digit conductor, and means responsive to a digit dialed over said calling line following said operation of said switching apparatus to seize said link for repeating said last mentioned digit over said digit conductor.

14. In a telephone system, a calling line, automatic switching apparatus, means for connecting said calling line to said switching apparatus, a link, said switching apparatus being operated by certain first office code digits dialed over said calling line to seize said link and being operated by certain combinations of first and second office code digits dialed over said calling line to seize said link and being operated by certain combinations of first and second and third office code digits dialed over said calling line to seize said link, three control conductors, three sets of office code digit conductors, means controlled by operation of said switching apparatus by a first office code digit to seize said link for marking with a marking potential the first of said control conductors and for marking with a marking potential the value of said first office code digit upon the first set of said office code digit conductors and controlled by operation of said switching apparatus by a combination of first and second office code digits to seize said link for marking with a marking potential the first and second of said control conductors and for marking with a marking potential the value of said first and second office code digits respectively upon the first and second sets of said office code digit conductors and controlled by operation of said switching apparatus by a combination of first and second and third office code digits to seize said link for marking with a marking potential the first and second and third of said control conductors and for marking with a marking potential the values of said first and second and third office code digits respectively upon the first and second and third sets of said office code digit conductors, a digit conductor, means responsive to a digit dialed over said calling line following said operation of said switching apparatus to seize said link for repeating said last mentioned digit over said digit conductor, three office code digit registers, a number of numerical digit registers, a register sequence switch having access to all of said digit registers and normally selecting the first of said office code digit registers, means responsive to marking of the first of said control conductors for operating said register sequence switch to select the second of said office code digit registers and for operating the first of said office code digit registers to register a first office code digit as marked by the first set of said office code digit conductors, means responsive to marking of the second of said control conductors for operating said register sequence switch to select the third of said office code digit registers and for operating the second of said office code digit registers to register a second office code digit as marked by the second set of said office code digit conductors, means responsive to marking of the third of said control conductors for operating said register sequence switch to select the first of said numerical digit registers and for operating the third of said office code digit registers to register a third office code digit as marked by the third set of said office code digit conductors, and means responsive to repeating of a digit over said digit conductor for registering the repeated digit in the one of said digit registers selected by said register sequence switch and then for operating said register sequence switch to select the next adjacent one of said digit registers.

15. In a telephone system, a calling line, a link, means for connecting said calling line to said link, a register-sender, means for connecting said register-sender to said link, means for registering in said register-sender a fixed number of office code digits and a given number of numerical digits dialed over said calling line, means included in said register-sender and controlled by said fixed number of office code digits registered therein for registering one or more routing digits therein, additional means included in said register-sender for sending therefrom over said link said one or more routing digits registered therein followed by a register control signal and then said fixed number of office code digits registered therein and finally said given number of numerical digits registered therein, and means governed by said register control signal for registering in said link each of said office code digits and each of said numerical digits sent over said link.

16. In a telephone system, a calling line, a link, means for connecting said calling line to said link, a register-sender, means for connecting said register-sender to said link, means for registering in said register-sender a fixed number of office code digits and a given number of numerical digits dialed over said calling line, means included in said register-sender and controlled by said fixed number of office code digits registered therein for registering one or more routing digits therein, additional means included in said register-sender for sending therefrom over said link said one or more routing digits registered therein followed by a register control signal and then said fixed number of office code digits registered therein and finally said given number of numerical digits registered therein, a selector-repeater connected to said link, a trunk line, said selector-repeater being operated by the first of said routing digits to select said trunk line and then to repeat over said trunk line the remainder of said digits received over said link, and means included in said selector-repeater and governed by said register control signal for registering in said link each of said office code digits and each of said numerical digits sent over said link.

17. In a telephone system, a link, means for sending over said link a series of digits and a register control signal between two of the digits of said series, a trunk line, means included in said link for repeating over said trunk line said series of digits sent over said trunk, and additional means included in said link and governed by said register control signal for registering in said link each of the digits in said series sent over said link following the sending of said register control signal over said link.

18. In a telephone system, a calling line, a plurality of links, automatic switching apparatus operated by one or more digits dialed over said calling line for extending a connection from said calling line to one of said links, register equipment, recapture relay means provided in said one link and responsive to the extension of said connection to said one link for immediately recapturing the one or more digits employed in the operation of said switching apparatus to extend said connection from said calling line to said one link and for immediately registering the recaptured one or more digits in said register equipment, repeat relay means provided in said one link for receiving other digits dialed over said calling line following the extension of said connection from said calling line to said one link and for registering the received other digits in said register equipment, a called line, and means governed by digits registered in said register equipment for completing a connection from said one link to said called line.

19. In a telephone system, a calling line, a plurality of links, automatic switching apparatus operated by one or more digits dialed over said calling line for extending a connection from said calling line to one of said links, a register-sender, means including a plurality of recapture relays provided in said one link and responsive to the extension of said connection to said one link for immediately recapturing the one or more digits employed in the operation of said switching apparatus to extend said connection from said calling line to said one link and for immediately registering the recaptured one or more digits in said register-sender, means including a repeat relay provided in said one link for receiving other digits dialed over said calling line following the extension of said connection from said calling line to said one link and for registering the received other digits in said register-sender, a called line, and means governed by digits sent from said register-sender for completing a connection from said one link to said called line.

20. In a telephone system, a calling line, a plurality of links, a plurality of register-senders, means for preselecting an idle one of said register-senders to be used by an idle one of said links, automatic switching apparatus operated by one or more digits dialed over said calling line for extending a connection from said calling line to an idle one of said links, means including a plurality of recapture relays provided in said one link and responsive to the extension of said connection to said one link for immediately recapturing the one or more digits employed in the operation of said switching apparatus to extend said connection from said calling line to said one link and for immediately registering the recaptured one or more digits in the preselected idle one of said register-senders, means including a repeat relay provided in said one link for receiving other digits dialed over said calling line following the extension of said connection from said calling line to said one link and for registering the received other digits in said one register-sender, a called line, and means governed by digits sent from said one register-sender for completing a connection from said one link to said called line.

References Cited in the file of this patent

UNITED STATES PATENTS

| Number | Name | Date |
|---|---|---|
| 2,300,829 | Gooderham | Nov. 3, 1942 |
| 2,301,015 | Busch | Nov. 3, 1942 |
| 2,342,279 | Hersey | Feb. 22, 1944 |
| 2,447,533 | Retallack | Aug. 24, 1948 |
| 2,629,016 | Gooderham | Feb. 17, 1953 |